(12) United States Patent
Purkey

(10) Patent No.: US 6,426,606 B1
(45) Date of Patent: Jul. 30, 2002

(54) APPARATUS FOR PROVIDING SUPPLEMENTAL POWER TO AN ELECTRICAL SYSTEM AND RELATED METHODS

(75) Inventor: Bruce Purkey, Rogers, AR (US)

(73) Assignee: Purkey Electrical Consulting, Rogers, AR (US)

( * ) Notice: Subject to any disclaimer, the term of this patent is extended or adjusted under 35 U.S.C. 154(b) by 0 days.

(21) Appl. No.: 09/802,112

(22) Filed: Mar. 8, 2001

Related U.S. Application Data
(60) Provisional application No. 60/238,903, filed on Oct. 10, 2000.

(51) Int. Cl.⁷ .................................................. H02J 7/00
(52) U.S. Cl. ...................................................... 320/103
(58) Field of Search .................................. 320/166, 103, 320/104, 119, 126; 307/10.1, 150

(56) References Cited

U.S. PATENT DOCUMENTS

| | | | |
|---|---|---|---|
| 3,638,108 A | 1/1972 | Channing | 324/433 |
| 4,161,682 A | 7/1979 | Corvette | 320/105 |
| 4,492,912 A | 1/1985 | Nowakowski | 320/123 |
| 4,494,162 A | 1/1985 | Eyler | 361/29 |
| 4,510,431 A | 4/1985 | Winkler | 320/103 |
| 4,540,929 A | 9/1985 | Binkley | 320/104 |
| 4,727,306 A | 2/1988 | Misak et al. | 320/152 |
| 4,857,820 A | 8/1989 | Tompkins et al. | 320/161 |
| 4,902,955 A | 2/1990 | Manis et al. | 320/105 |
| 5,077,513 A | 12/1991 | Dea et al. | 320/115 |
| 5,146,095 A | 9/1992 | Tsuchiya et al. | 290/38 R |
| H001172 H | 4/1993 | Gorniak | 307/48 |
| 5,207,194 A | 5/1993 | Clerici | 123/179.1 |
| 5,321,389 A | 6/1994 | Meister | 340/455 |
| 5,637,978 A | 6/1997 | Kellett et al. | 320/104 |

(List continued on next page.)

OTHER PUBLICATIONS

John R. Miller, Joseph Burgel, Henry Catherirno, Fred Krestik, John Monroe, and James R. Stafford, Truck Starting Using Electrochemical Capacitors, 1998, pp. 1–8.

John R. Miller, "Engineering Battery–Capacitor Combinations In High Power Applications: Diesel Engine Starting," Dec. 1999, pp. 1–11.

Goodall Mfg. LLC, "Charge–All Wheel Type Battery Chargers" Brochure, p. 19 Circa Dec. 2000; Eden Prairie Minn.

IntraUSA, "The Intra Switch" Brochure; Aug. 2000.

IntraUSA, "Intra Switch: Superior Cost Performance" Brochure; Aug. 2000.

Kbi/Koldban Int'l Ltd., "KAPower Super Capacitors", Brochure, pp. 1–4; Circa Dec. 2000; Lake In The Hills, Ill.

(List continued on next page.)

Primary Examiner—Edward H. Tso
Assistant Examiner—Pia Tibbits
(74) Attorney, Agent, or Firm—Bracewell & Patterson, L.L.P.

(57) ABSTRACT

An apparatus and method for providing supplementary power to an electrical system of a vehicle or other machinery is provided. The apparatus and methods specifically provide a rapid-delivery of high amounts of power. The significant power levels are sufficient, for example, to turn the starter of a heavy-duty commercial transport vehicle stranded by a disabled battery. The power is supplied by a power source having the combination of high-density capacitor and battery. The power delivery is controlled to avoid such standard problems as reverse or same polarity connections and overvoltage. Control is effected by a combination voltage sensing circuit and isolation circuit to prevent current between the power source and the electrical system unless prescribed conditions are satisfied. The energy level of the power source is sustained by the capacitor-battery combination along with the capabilities to receive return charging from the electrical system as well as from alternating current and direct current sources.

26 Claims, 16 Drawing Sheets

U.S. PATENT DOCUMENTS

| | | | |
|---|---|---|---|
| 5,783,872 A | 7/1998 | Blair | 320/104 |
| 5,793,185 A | 8/1998 | Prelec et al. | 320/104 |
| 5,925,938 A | 7/1999 | Tamor | 290/31 |
| 5,963,417 A | 10/1999 | Anderson et al. | 361/503 |
| 5,998,961 A | 12/1999 | Brown | 320/105 |
| 6,057,667 A | 5/2000 | Mills | 320/105 |
| 6,265,851 B1 * | 6/2000 | Brien et al. | 320/162 |
| 6,130,519 A | 10/2000 | Whiting et al. | 320/105 |
| 6,133,645 A | 10/2000 | Scribner et al. | 307/9.1 |
| 6,211,577 B1 | 4/2001 | Alksnat et al. | 290/37 R |
| 6,212,054 B1 | 4/2001 | Chan | 361/170 |
| 6,222,342 B1 | 4/2001 | Eggert et al. | 320/105 |
| 6,242,887 B1 | 6/2001 | Burke | 320/104 |

OTHER PUBLICATIONS

Kbi/Loldban Int'l., "KAPower Installation–Operation Manual," pp. 1–12; Circa Jun., 2000; Lake In The Hills, Ill.

Purkey Fleet Electric, Inc., "Battery Optimizer", Brochure, pp. 1–2; 1998; Rogers Ark.

Sure Power Industries, Inc., "Low–Voltage Disconnects" Brochure, pp. 1–2; Circa Aug. 1998; Tualatin, Oregon.

* cited by examiner

APPARATUS FOR PROVIDING SUPPLEMENTAL POWER TO AN ELECTRICAL SYSTEM AND RELATED METHODS

CROSS-REFERENCE TO RELATED APPLICATIONS

This application claims the benefit of Provisional Patent Application No. 60/238,903 filed Oct. 10, 2000, and titled Apparatus For Providing Portable Power To Machinery And Related Methods and is incorporated herein by reference in its entirety.

FIELD OF THE INVENTION

The present invention relates to the portable power source industry and, more particularly, to the field of portable power sources for providing supplemental power to electrical and mechanical systems.

BACKGROUND OF THE INVENTION

The need for a portable power source arises frequently in a variety of circumstances. Among the most common of circumstances is the situation in which a commercial or family vehicle fails to start because of a "dead" battery. A commercial or family vehicles typically is powered by a conventional internal combustion engine which requires a separate electric motor (i.e., "starter") that rotates the engine crankshaft at a speed sufficient to start the engine. Because the starter is electrically powered by an automobile battery, if the battery goes dead or otherwise loses a substantial amount of stored energy when the vehicle's lights or radio are left on while the engine is off, then the engine will not start. This phenomenon has existed since the introduction of the electric starter and lead acid storage battery on a vehicle, and it is especially prevalent during cold weather when vehicles are generally more difficult to start and extra engine-off loads are left on (e.g., electrical heaters) causing the vehicle's battery to discharge even faster.

In such circumstances, it is necessary to have the benefit of a supplemental source of power to "jump start" the vehicle's engine. With a jump start, because the vehicle battery does not have the needed energy or electrical "push" (i.e., voltage) necessary, supplementary power is applied to the electrical system or starter motors. Jump starts typically have been applied two ways: (1) application of additional battery power in parallel with the existing battery or batteries on the vehicle or machinery; and (2) generation of direct current power produced by a generator or alternator driven by a separate engine.

Thus, with respect to the first method of providing a jump start, most conventional devices still continue to rely on a direct current power source provided by a battery. Recent examples of such devices are U.S. Pat. No. 6,130,519 to Whiting et al. titled Portable Battery Charger Including Auto-Polarity Switch and U.S. Pat. No. 5,793,185 to Prelec et al. titled Jump Starter, which describe power booster devices using a battery. The jump start is performed with the application of extra battery power in parallel with the existing battery on a vehicle and requires that connecting leads, or "jumper cables," be connected from an external power source, conventionally a separate battery, to the battery on the vehicle. With this method of jump starting, the separate, charged battery provides extra energy to the disabled battery of the vehicle and thus may enable the engine starting operation. In essence, the extra battery is temporarily boosting the voltage, and thus, the available power in the system, so that the starter motor may have sufficient energy to start the engine; that is, this momentary boost in electrical energy to the starter motor may be sufficient to start the engine if the supplemental battery provides sufficient power.

Unfortunately, the supplemental battery does not always provide sufficient power. The amount of power required by the supplemental battery is a function of many factors, including the size of the engine to be started, its temperature, oil, and viscosity, as well as the remaining energy of the disabled vehicle battery. The supplemental battery must provide enough additional energy to equal the normal level of power available from a fully charged battery installed in the vehicle. If, for example, the vehicle battery is completely discharged, the supplemental battery may not have sufficient energy to make the starter motor function properly. Some devices have sought to boost the energy supplied by a supplementary battery used to recharge a disabled battery. U.S. Pat. No. 5,637,978 to Kellett et al. titled Battery Booster, for example, describes a "boost converter" comprising a switch, diode and inductor to step up the primary power supplied by a battery. Depending on the above-described conditions, however, the additional 2 to 3 volts provided may not be sufficient, especially in attempting to start the heavy engine of a large-sized heavy-duty commercial vehicle. U.S. Pat. No. 4,510,431 to Winkler titled D.C. Stepped-Up Voltage Transfomerless Battery Charger, steps up the voltage of a direct current battery by applying a supplementary source power via alternating current to a capacitor. While this may be useful for recharging batteries in hand-held devices (e.g., walkie-talkies or radios), it may not be suitable for recharging vehicle batteries stranded away from a source of alternating current and requiring a much greater supplementary power.

Moreover, conventional devices, because of the limited amount of supplementary power delivered in a single, short burst, frequently require significant time durations to recharge the vehicle battery. The level of discharge of the existing vehicle battery, as noted, will determine at least partly the time necessary to recharge a disabled battery, or even whether the vehicle can be jump-started at all. If the supplementary battery power has insufficient power itself, the discharged battery may require significant time to receive the energy flow needed so that it can work with the supplementary battery to start the engine. At lower temperatures for example, the energy flow becomes slower. When temperature is low the chemical properties of a conventional battery do not allow the battery to function as well in any charge condition, but especially when it is severely discharged. If severely discharged, then the vehicle battery may take a significant amount of time to recharge.

Conventional techniques pose other problems as well. Initially, when batteries are connected in parallel, the discharged battery begins to draw energy from the charged battery. If left in a steady state, the discharged battery will eventually drain energy from the charged battery to the point where the combination of the parallel batteries will reach equilibrium with equal electrical energy in each.

Conventional techniques also can create other potential problems as well. Sparks can be generated when the supplementary battery is electrically connected to the existing vehicle battery. If the battery is connected improperly, the likelihood of sparks increases. There is also potential damage to both the vehicle battery and the vehicle electrical system. Gases produced by the battery can be ignited causing explosion and bodily harm to the installer along with damage to the vehicle.

Providing a power boost can alternatively be accomplished by generation of direct current power produced by generators or alternators that are driven by some type of engine. As with providing a supplementary battery to boost power, in order for a standby power generation unit to be effective, it needs the capability to produce sufficient power to either activate the starting motor independently or it must supplement the existing vehicle battery as already described above. It is generally not practical, due to size and cost, to have a generator set large enough to turn the engine by itself. Therefore, a jump start using this method is normally accomplished by boosting output voltage of the generator set beyond normal operating levels in order to charge the existing vehicle battery.

This increased voltage, however, leads to its own set of potential problems. The voltage levels produced are conventionally controlled either manually or by built in voltage regulators. When set manually, an operator must monitor the output of the unit and the charging process. The charging process takes time as described above. This requires that the operator devote full attention to the process. It is costly, though, for an operator to simply watch the unit perform. If the unit performs out of control, however, damage will be caused to the batteries and potentially to the starter motor and electrical system of the vehicle. If the unit is left completely unattended, the voltage can climb to an unsafe level and explosion can occur causing damage to the battery, generator set, vehicle electrical system, and potentially bodily harm to persons within the vicinity of the vehicle. The least of the problems that will result from overcharge is shortened life from the vehicle battery.

If the unit is controlled by built-in voltage regulators, they can and often do fail. Calibrations are seldom checked. Regulators are seldom serviced. Therefore, even in an automatic mode, potential runaway overcharge can and often does occur.

In either mode of supplying supplementary power, the engine that drives the generator set must have fuel. If the unit is operating unattended, the engine can run out of fuel at an inopportune time. At this point, the generators attempt to reverse action. They start drawing energy from the battery which was formerly being charged as the generator attempts to function as a starter motor to turn the engine which is normally its driver. The result is that the battery is again discharged. In summary, the operation of a standby generator set is costly with operator in attendance, but very dangerous without operator in attendance.

SUMMARY OF THE INVENTION

In view of the foregoing background, the present invention advantageously provides an apparatus and method for delivering supplemental power to the electrical system of a vehicle or other machinery. The advantages afforded by the claimed invention and described herein provide particular benefits in boosting power in the electrical system of a vehicle disabled by a discharged battery. The claimed invention provides a power source with the capability to convey concentrated, rapid-delivery power to an electrical system, while automatically controlling the extent and timing of power delivery so as to deliver an optimal amount of power without risk of overloading the electrical system being boosted.

Specifically, the claimed invention utilizes an electronically controlled power booster combination of high-density capacitor and battery. The capacitor, as described in detail below, is capable of storing a tremendous amount of charge and is thereby able to provide, via rapid transference of concentrated energy, a substantial power boost to an electrical system. As further described below, the claimed invention utilizes a capacitor-battery combination that includes an electrochemical capacitor, which depending on its particular construction can contribute to the storage of tremendous amounts of charge. The energy level of the capacitor is sustained at or above a preselected minimum level by the electrically connected battery.

An apparent offset to the advantages associated with rapid-burst, high-concentration power delivery, however, is that too much power may be delivered too quickly to the electrical system or before an improper connection between the power booster and electrical system has been detected. The present invention overcomes this problem by providing a power delivery controller having electronic circuitry that optimally controls power delivery as alluded to above. Specifically, the power delivery controller includes voltage detecting capabilities to detect voltage conditions in the electrical system to receive a power boost and an isolation circuit responsive to the detected voltage conditions to optimally control power delivery. More specifically, the voltage conditions indicate when a proper connection between the power source and the electrical system has been established, when power is to be supplied from the power source, and when an optimal amount of power has been delivered to the electrical system from the power source. These capabilities, thus, work jointly to determine when the proper conditions for power delivery exist, then respond by permitting power delivery from a power booster source to the electrical system, and finally block power delivery as soon as the optimal amount of power has been delivered.

In the specific context of starting a vehicle disabled by a discharged battery, the invention determines whether a power source connection has been properly made between a power source and the vehicle battery. If so, it allows the power source to rapidly deliver concentrated power to the vehicle from the power source comprising a combination capacitor (preferably an electrochemical type) and battery. The concentrated power is delivered directly to the vehicle's alternator and engine in sufficient amounts to start the vehicle engine without having to rely on the vehicle's discharged battery for power. When the vehicle engine starts, the vehicle's engine begins to recharge the discharged vehicle battery, and the electronically controlled isolation circuit blocks further power delivery from the power source. Only power enough to turn the alternator and start the vehicle's engine is delivered from the power source and no more, thereby avoiding risk of providing too much power too quickly.

Continuing in the context of providing a power boost to a disabled vehicle, a further advantage of the present invention is the ability to replenish the capacitor using the very vehicle which has been started in the manner just described. As noted, the electronically controlled isolation circuit blocks further power delivery from the power source as soon as the engine of the disabled vehicle has been started. The power connection between the vehicle and the power source is maintained, though, according to the present invention, so that as the now-started vehicle engine begins to recharge the vehicle battery it also delivers energy to the capacitor. The result is that power that was delivered from the power source to start the vehicle is now returned to the power source to be stored by the power source capacitor. In this sense, the invention provides a sustainable source of power for boosting an electrical system.

Again, in the context of boosting the disabled battery of a heavy-duty vehicle, sufficient energy is provided by a power source combining a high-density capacitor and battery as to turn a large engine to thereby efficiently and rapidly start the vehicle. Thus, the claimed invention's ability to provide a rapid-delivery, concentrated power boost is uniquely suited to recharging disabled batteries on large commercial transport vehicles quickly and efficiently. The claimed invention's ability to provide substantial power boosts, in contrast to the generators and similar devices earlier described, is not at the expense of a large and cumbersome construction; the claimed invention is highly portable. It can be lifted by hand onto a vehicle or cart for long distance transport and thus, the claimed invention's ability to provide a portable power boost is uniquely suited to recharging disabled batteries on large commercial transport vehicles stranded in remote areas. This combination of rapid, high power delivery and portability provides considerable advantages over conventional charging devices and methods.

As described, although designed to deliver high levels of power, the claimed invention also possesses unique features that match voltages so as to avoid damage to the electrical system during power transfers and control where dispensed energy is delivered. Specifically, the claimed invention has a control capacity to determine the voltage requirements of the electrical system. It also isolates the source of power from the electrical system until a proper power delivery connection is made so as to avoid inadvertent discharge or overvoltages owing to improper hook-up between the power source and the electrical system. There is, thus, a built-in reverse polarity protection. Relatedly, there is same polarity protection in the sense that an accidental connection of power source conductors to the same terminal of the electrical system battery causing a direct short will be "sensed" before power delivery is initiated, thereby reducing risk of damage to the invention and the electrical system.

The claimed invention achieves these advantages, as already noted, by providing a combination voltage detecting or sensing circuit working jointly with an isolation circuit that prevents delivery of power from the invention's power source unless the proper voltage determinations are made. In one specific embodiment of the invention, a manually actuated switch prevents any current exchange until the operator has connected the power booster and the electrical system and is safely situated to remotely control power delivery. Even after the switch is actuated, the sensing circuit operates to detect whether the proper voltages exist at power supply connection (i.e., a 0.7V voltage across the terminals of a disabled battery). If not, the isolation circuit, which can be an arrangement of magnetic switches, prevents any electrical current to pass between the power source and the electrical system. If a proper connection has been made, the capacitor-battery combination power source delivers through the power supply connection a high concentration of power.

In an alternative embodiment, the voltage detection circuit and isolation circuit include a processor and timer. The voltage within the electrical system is detected after the connection is made between the power booster and the electrical system. The process further includes a register to store a numerical indicator of the initial voltage detected. If a subsequent drop in voltage is detected (expected to be approximately a 2V drop in voltage), the processor signals the isolation circuit to permit current-borne delivery of power. In conjunction with the timer, then, the processor compares subsequent voltage with the initial voltage and determines whether an expected rise in voltage has occurred within a prescribed time interval (expected to be approximately a 1.5V rise in voltage within approximately 10 seconds). If so, then the processor signals the isolation circuit to permit continued passage of current for a second prescribed time interval, during which the electrical system will be sufficiently recharged and current will reverse so that the power source can be recharged by the now-enabled electrical system. If the expected rise in voltage does not occur within the first time interval, however, the isolation circuit operates to block any further current passing because of an incorrect connection or inherent problems in the electrical system itself.

These alternative embodiments, with varying degrees in cost of manufacture and of efficiency for the operator, each provide the capabilities alluded to earlier regarding the avoidance of overvoltage (with the corresponding risks of sparking), shorts, and damaging polarity reversals. Specifically, the ability, automatically and manually, to electrically isolate the power source and the electrical system during the process of making a power delivery connection avoids risks of sparking when connecting and disconnecting the separate conductors. These alternative embodiments also provide reverse polarity protection in that if an improper hook-up is made, the power booster avoids delivery of power thereby reducing the risk that the electrical system or booster will be damaged. Similarly, there is same-polarity protection in that if a short condition is created by improperly connecting both power booster conductors to the same terminal of the electrical system, no power delivery will be initiated, thereby reducing the risk that the electrical system or booster will be damaged.

It is further envisioned that the same voltage sensing circuitry and associated isolation circuits would have other applications in the context of electrical starting systems for vehicle engines using capacitors in lieu of or in conjunction with conventional starter batteries. The U.S. Army, for example has experimented with starting systems comprising only two batteries and a capacitor for use with the diesel engines for five- and seven-ton vehicles. See, e.g., J. R. Miller, J. Burgel, H. Catherino, F. Drestik, J. Monroe and J. R. Stafford, Truck Starting Using Electrochemical Capacitors (1998). Such vehicles are difficult to start (especially at low temperatures) and normally require four batteries for starting, which necessitates frequent and costly battery replacements. Use of such alternative systems was pioneered more than a decade ago by the Russian military and is expected to become increasingly more common in many vehicles in the years ahead. One additional advantageous use, then, of the sensing circuitry and associated isolation circuits of the present invention, would be to provide monitoring within such a system to detect a malfunctioning alternator or other impediment to starting the engine that does not result from a discharged capacitor or battery. Failure to start the engine owing to reasons having nothing to do with a discharged battery or capacitor are important to detect, and the earlier, the better. Doing so can avoid unnecessary dissipation of the capacitor and/or battery as when power is drained from the system by an internal system fault or by vainly trying to start the engine disabled by a faulty electrical system. Detection can also avoid potentially damaging attempts to boost the capacitor or battery when in fact the failure to start is due to some inherent problem in the electrical system.

Yet a further advantage of the present invention is the ability to perform multiple power boosts, or "jump starts," between recharging of the power source. Indeed, under normal operating circumstances, it is expected that the claimed invention will provide at least 10 times, and likely many more, the number of power boosts than conventional devices and methods currently provide. The high-density capacitor is maintained by the connected batter. Moreover, as earlier described, after the invention recharges an electrical system, the electrical system can return a replenishing charge to the high-energy/battery combination. The purposefully selected low internal resistance of the capacitor, moreover, enhances the capacitor's capability to accept the recharge current from even a small or nearly discharged battery. This lower resistance further enables the capacitor to be rapidly recharged, as for example by a jump started vehicle alternator. Under normal circumstances, recharging can take less than a minute. These features, therefore, allow the capacitor to maintain sufficient voltage to provide enumerable power boosts over virtually any span of time.

The advantages provided by this recharge capability are further enhanced by the ability of the present invention to accept energy via either alternative current or direct current. Thus, the invention is adapted to include a conventional wall-plug to plug into a 110 volt wall socket to be recharged by conventional alternating current supplied to homes and businesses. At the same time, the invention is adapted to connect to a conventional 12 volt battery for recharging as well. Thus, for example, the invention can be recharged by a vehicle battery as the invention is being transported on the vehicle to a remote site where it is to be employed to boost the discharged battery of a stranded vehicle, thereby further supplementing the invention's advantage relative to conventional devices and methods.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
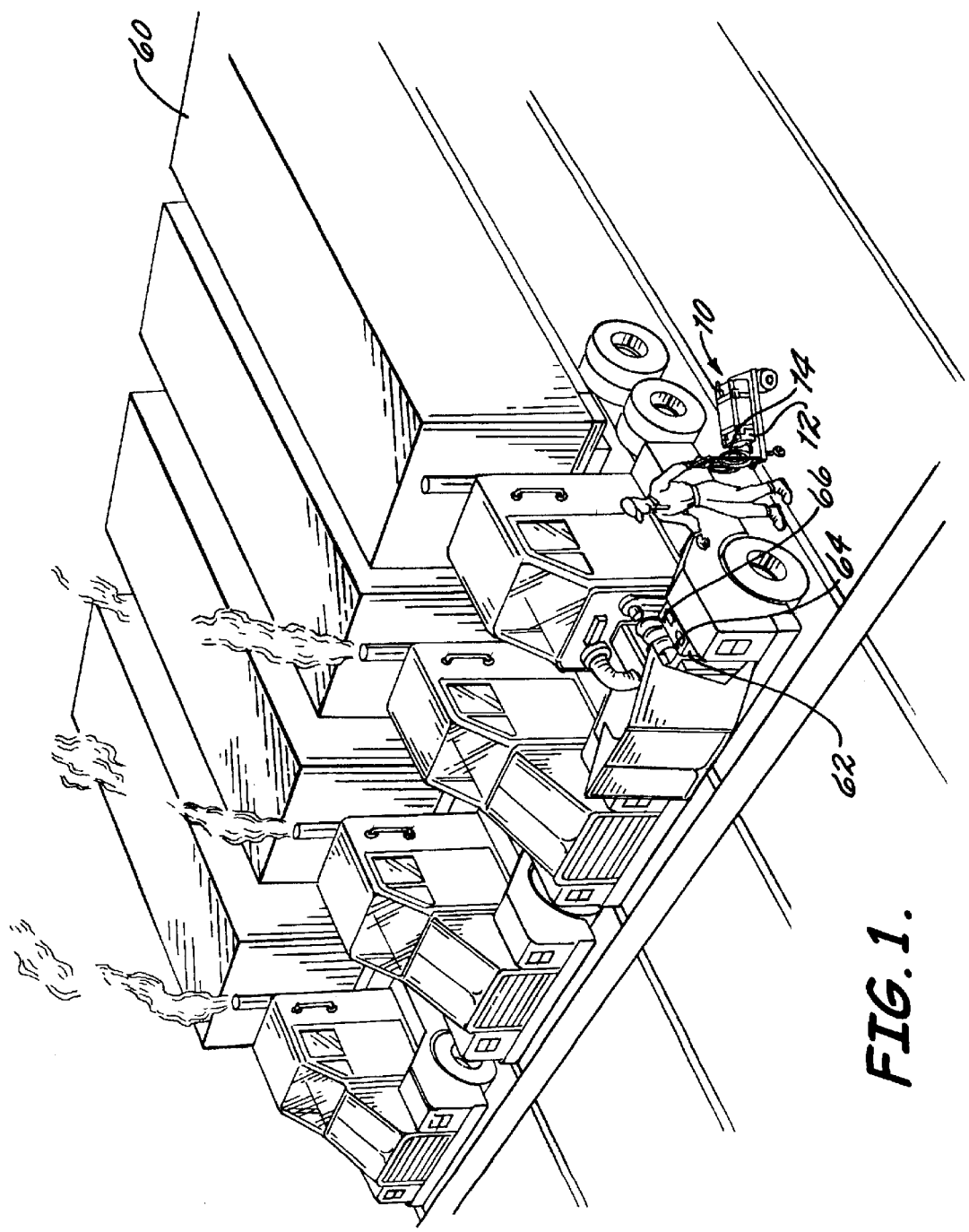
FIG. 1 is perspective view of a heavy-duty commercial-sized vehicle stationarily placed and an apparatus for providing supplemental power being positioned near the vehicle to provide power to the vehicle's electrical system according to the present invention.
Figure 2:
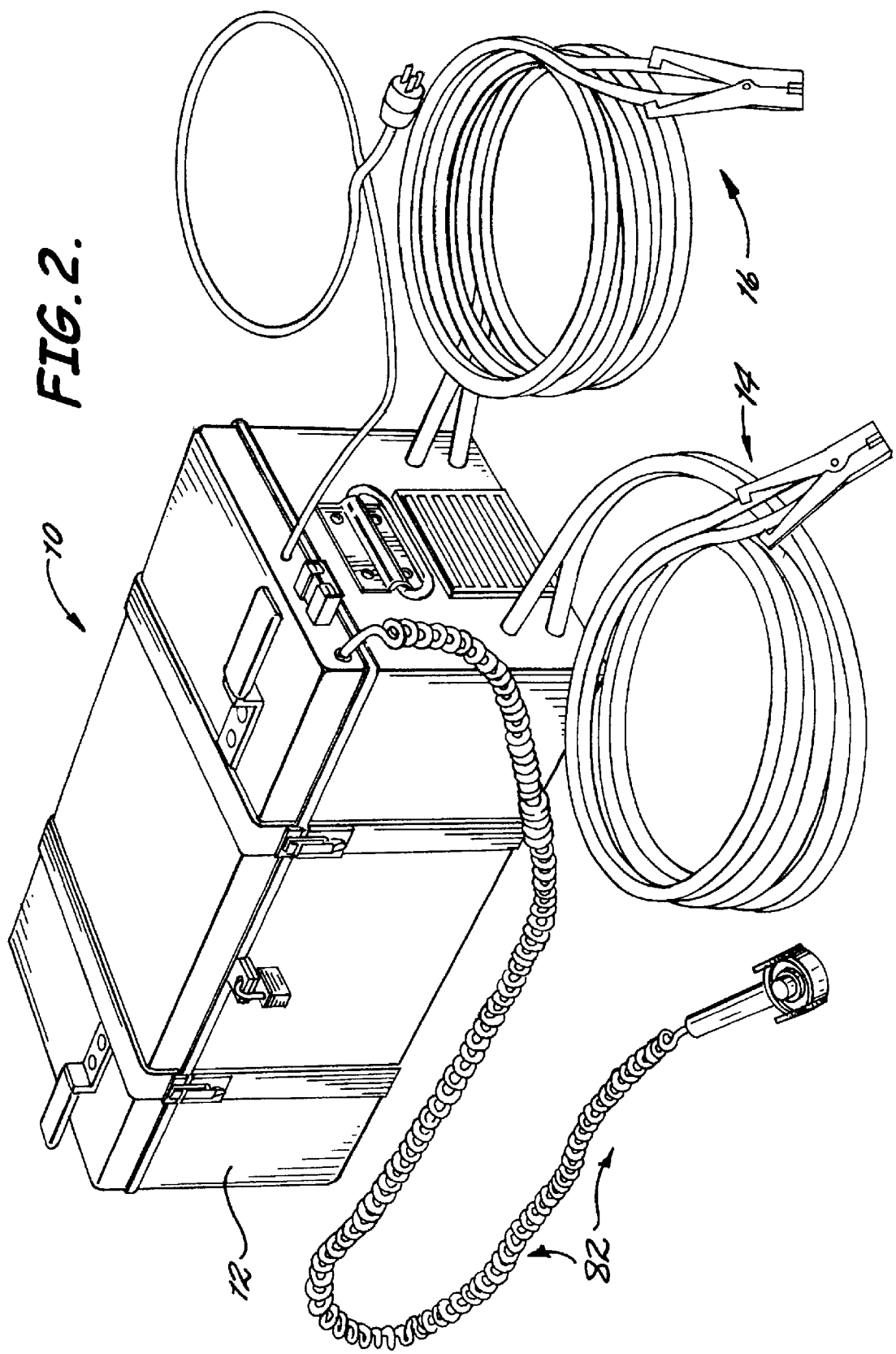
FIG. 2 is a perspective view of the exposed conductors and switch extending from a housing containing an apparatus for providing supplemental power to an electrical system according to the present invention.
Figure 3:
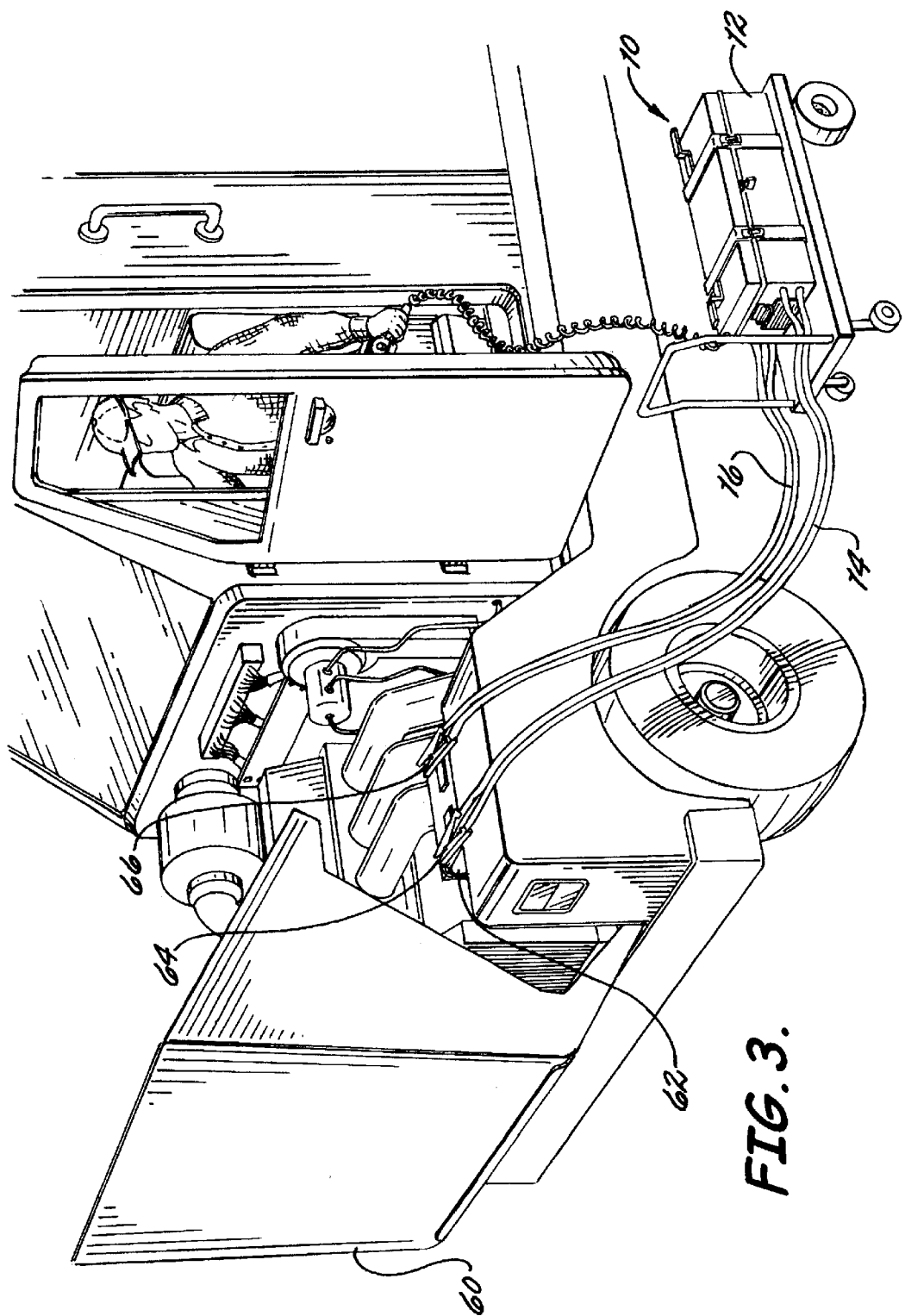
FIG. 3 is a perspective view of an apparatus for providing supplemental power to an electrical system connected to the disabled battery of a commercial vehicle so as to provide power to the battery according to the present invention.

FIG. 1 illustrates a rapid-delivery portable power booster 10 for providing a supplementary source of power to an electrical system of a vehicle or other machinery as it is being positioned next to a heavy-duty commercial vehicle 60 disabled by a discharged vehicle battery 62. As illustrated in FIG. 2, the power booster 10 is contained within a power booster housing 12, extending outwardly from which are first and second electrical conductors 14, 16. As further illustrated in FIG. 3, the first and second electrical conductors 14, 16 extending outwardly from the housing 12 are used to establish a power supply connection between the power booster 10 and the respective positive and negative terminals 64, 66 of the discharged battery 62 of the electrical system of the vehicle 60. More generally, the first conductor 14 is positioned to detachably connect to any positive terminal of an electrical system and the second conductor 16 is positioned to detachably connect to any negative terminal of an electrical system. The connection is intended to selectively permit rapid delivery, of a concentrated amount of energy from a power source 20 within the housing 12 of the power booster 10 (see FIGS. 4, 8 and 11). A power supply connection is thereby provided between the power source 20 and the electrical system. Electrically connected, the power source 20 selectively exchanges power between the power source 20 and the electrical system.

Figure 4:
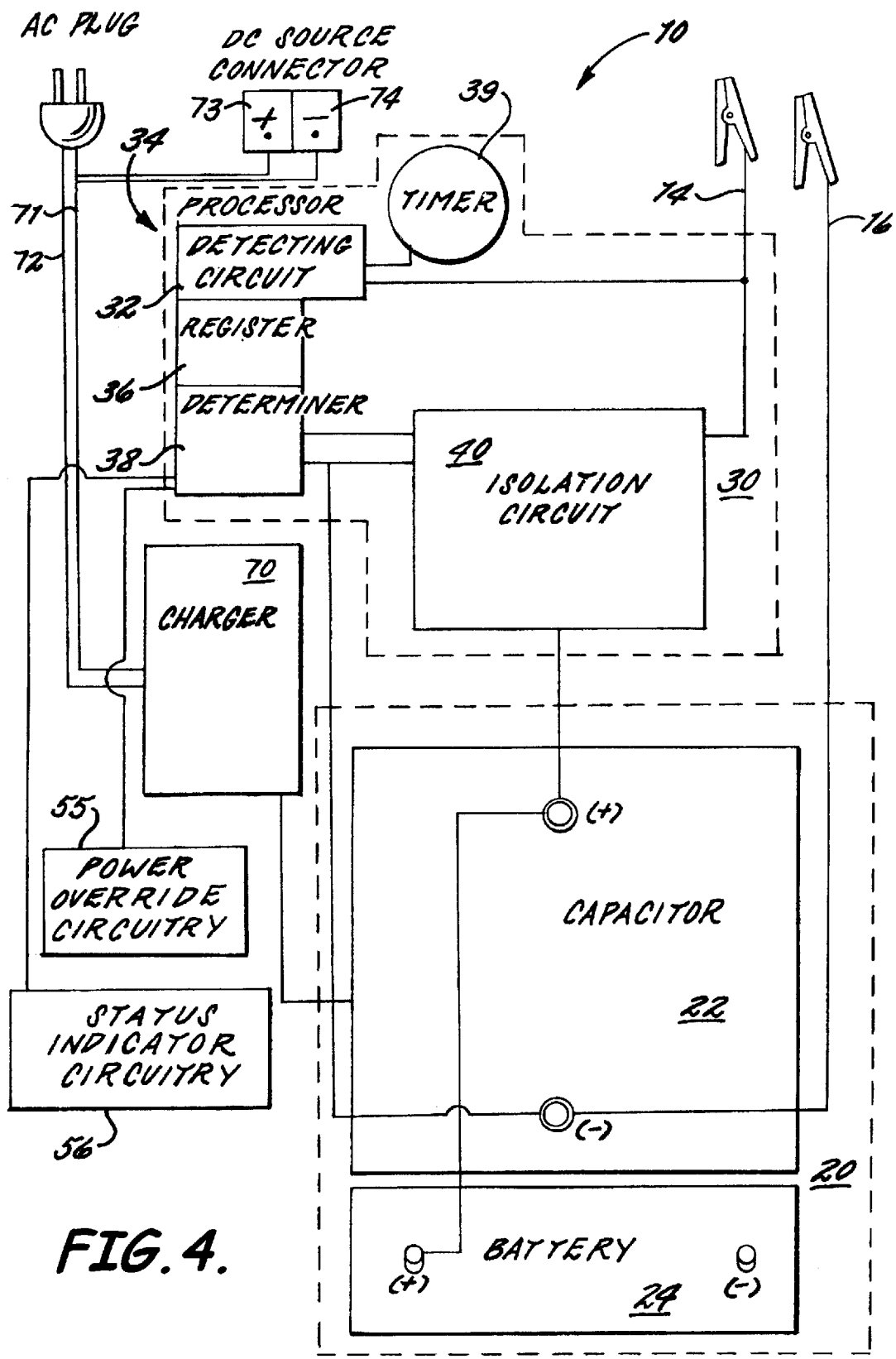
FIG. 4 is schematic diagram of the circuit elements of a power delivery controller, power source, and charger of a power booster according to the present invention.
Figure 11:
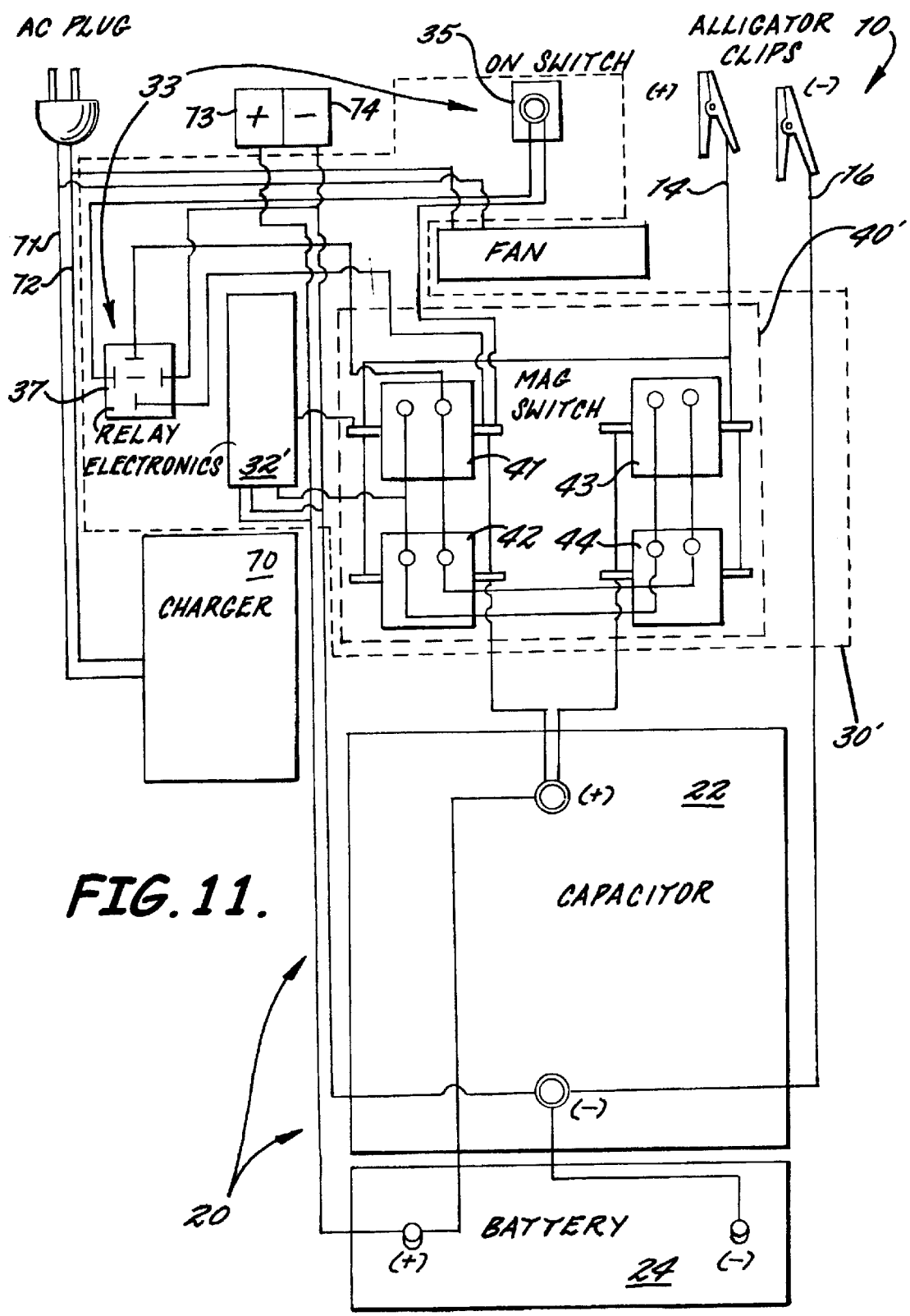
FIG. 11 is a schematic diagram of the electrical elements of one embodiment of an apparatus for providing supplemental power to an electrical system according to the present invention.

Selective exchange of power between the power source 20 and the electrical system is preferably controlled by a power delivery controller 30, 30' positioned within the housing 12 and connected to the power source 20 (see FIGS. 4 and 11). In a first embodiment, as illustrated in FIG. 4, the power delivery controller 30 preferably comprises a processor 34, a timer 39, and an isolation circuit 40. The processor 34 preferably includes a detecting circuit, defining a voltage sensor 32, connected to the first electrical conductor 14 to thereby sense the voltage of the electrical system and to provide numerical indicators X, Y, Z corresponding to sequentially sensed voltage levels of the electrical system. The processor 34 preferably also includes a voltage register 36 to store the value X that corresponds to the initial voltage sensed, and a voltage difference determiner 38 responsive to the voltage sensor 32 and the voltage register 36 to determine numerical decreases X−Y and increases X+Z in electrical system voltage relative to the initially detected voltage X.

As illstrated in FIG. 4, the isolation circuit 40, as noted, is also preferably part of the power delivery controller 30 and permits power exchange between the power source 20 and the electrical system by selectively permitting and inhibiting current flow through the power supply connection in response to specified voltage conditions, $r_i$, of the electrical system as determined by the microprocessor 34. In addition, the power delivery controller 30 preferably further includes a timer 39 positioned to measure elapsed times $t_i$ between discrete changes in the numerical indicator of electrical system voltages.

The power delivery controller 30 more specifically blocks electrical current between the power source 20 and the electrical system except under predetermined voltage conditions in the electrical system; that is, the isolation circuit 40, being responsive to the processor 34 remains open unless closed in response to predetermined sensed voltage conditions indicated by the processor 34. The power delivery controller 30 permits an electrical current to initiate between the power source 20 and the electrical system when the processor-determined numerical indicator Y of the electrical system voltage is within a first predetermined range $r_1$. The power delivery controller 30 then permits the electrical current to continue when the processor-determined numerical indicator Z of the electrical system voltage is within a second predetermined range $r_2$.

Figure 7:
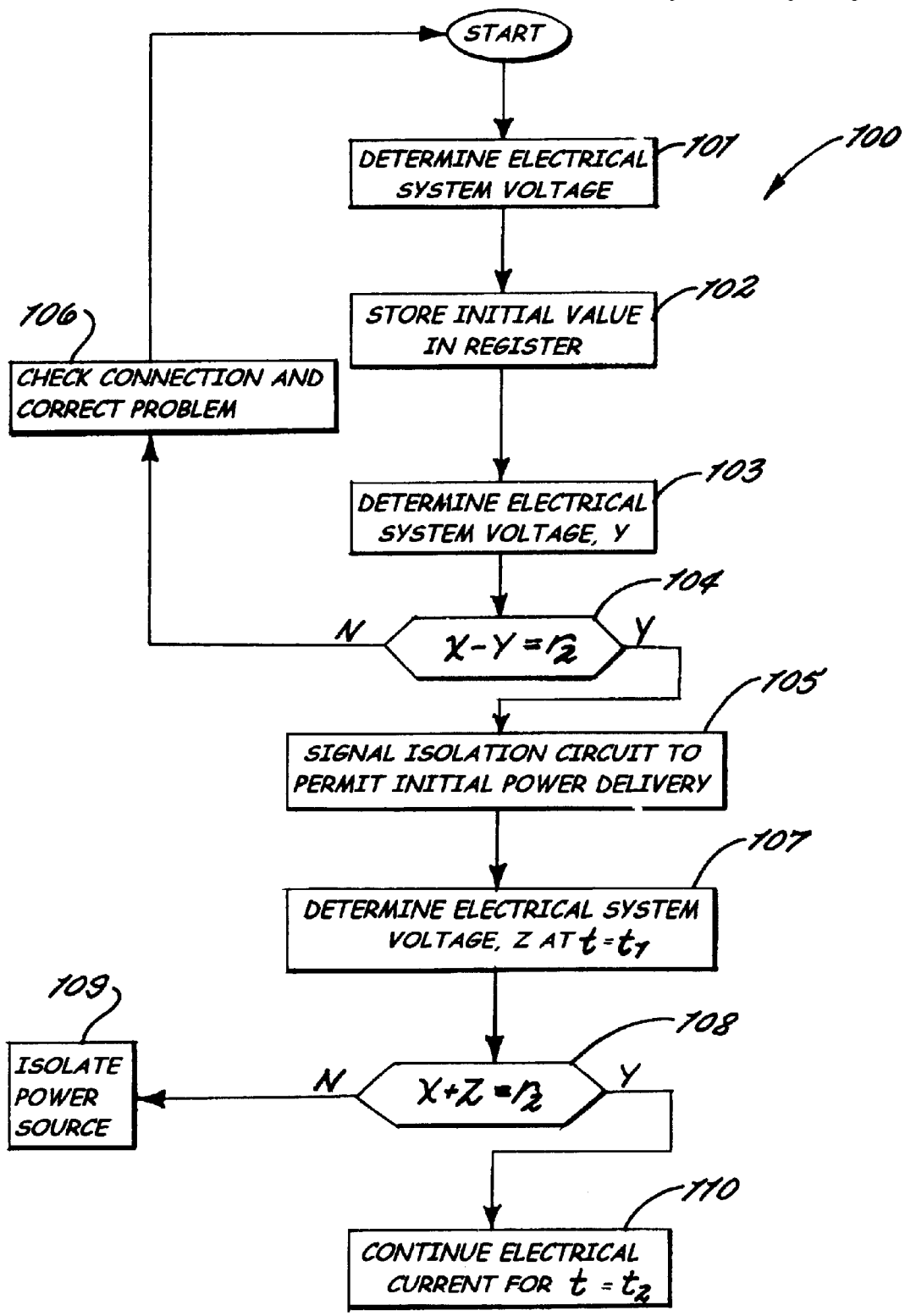
FIG. 7 is a schematic diagram depicting the steps of a method corresponding to the operation of a device for providing supplemental power to an electrical system according to the present invention.

In a first embodiment, then, the rapid-delivery portable power booster 10 selectively initiates an electrical current within the power supply connection between the power source 20 and the electrical system when the voltage of the electrical system is within a first predetermined range $r_1$, and then maintains the electrical current when the electrical system voltage is within a second predetermined range $r_2$ (see FIG. 7). In a second embodiment, however, the electrical current is selectively initiated when the voltage of the power source of portable power booster is within a first predetermined range $r_1'$, and the current in the power supply connection is maintained when the voltage of the power source of the portable power system is within a second predetermined range $r_2'$. Under ordinary circumstances, it is unimportant whether the sensed voltage is that of the electrical system or the portable power booster because the voltages will be identical; thus,too, $r_1=r_1'$ and $r_2=r_2'$ under such conditions. Moreover, an additional feature of the processor 34 is that it includes elements for storing both data and processing instructions thereby allowing the processor 34 to be programmed as will be readily understood by those skilled in the art. This additional feature allows the $r_1$ values and other parameters to be selected based on a variety of factors such as specifications of the particular electrical system (e.g., the make and model of a disabled vehicle to be jump started) and external conditions (e.g., temperature) that will affect the operation of the system.

More specifically, as illustrated in FIG. 4, the voltage register 36 of the processor 34 stores an initial numerical indicator X corresponding to an initial detected voltage of the electrical system. The voltage difference determiner 38 of the processor 34 is responsive to the voltage register 36 to determine numerical decreases X−Y and increases X+Z in electrical system voltage relative to the initial detected voltage. By computing a difference between the initial numerical indicator X and subsequent processor-determined numerical indicators Y,Z corresponding to subsequent voltage levels of the electrical system, the proper conditions for power exchange are determined so that the processor-responsive isolation circuit 40 permits initial current-borne delivery of power from the power source to the electrical system in response to a predetermined decrease in electrical system voltage and continues delivery of power in response to a subsequent predetermined increase in electrical system voltage relative to the initial detected voltage.

As already noted, the processor 34 preferably further includes a timer 39 positioned to measure elapsed time $t_i$ between discrete changes in the numerical indicator of electrical system or power source voltages and to measure elapsed time $t_j$ during which current is passed between the power source 20 and the electrical system. The processor signals the processor-responsive isolation circuit 40 to interrupt and block current between the power source 20 and the electrical system when a predetermined increase in voltage fails to occur within a first preselected elapsed time interval $t_1$. If, however, the preselected increase in voltage in fact occurred within the first preselected elapsed time interval $t_1$, the processor 34 signals the isolation circuit 40 to remain closed to thereby permit a current to be maintained between the power source 20 and the electrical system for a second preselected time interval $t_2$. During the second time interval $t_2$, there occurs a change in current direction, so that during the second preselected elapsed time interval $t_2$ the now-recharged electrical system will at least partially recharge the power source 20.

FIG. 7 illustrates some of the method aspects of the present invention while detailing the operation of the above-described power booster 10 utilizing a power delivery controller 30 that includes a voltage detecting circuit 32 and processor 34 having an initial voltage register 36 and a voltage difference determiner 38. Described in the context of providing power to the electrical system battery 62 of a commercial vehicle 60, the first and second electrical conductors 14, 16 of the power booster 10 are connected to the respective positive and negative terminals 64, 66 of the discharged battery 62 of the vehicle 60. The voltage detecting circuit 32 detects the initial voltage in the electrical system (Block 101). The initial voltage value is stored in the register of the processor (Block 102). If the physical connection is correctly established, there is an initial voltage drop in the electrical system. The voltage detecting circuit 32 detects the electrical system voltage (Block 103) and a determination is made by the voltage difference determiner 38 of the processor 34 (Block 104) regarding whether, in fact, the expected voltage drop has occurred. For example, given the conventional physical parameters associated with the electrical system battery in a large, heavy-duty commercial transport vehicle, 2V voltage drop is to be expected when an attempt to start the vehicle after the power supply connection is made between the electrical system and the power source 20. The voltage drop indicates that the power supply connection has properly been made. In response, the processor 34 signals the isolation circuit 40 to permit an initial delivery of current-borne power to the electrical system (Block 105); otherwise current is blocked and the physical power supply connection must be rechecked (Block 106).

While the isolation circuit permits current to pass, the timer 39 will mark the elapsed time. The electrical system voltage will continue to be detected (Block 107) by the voltage detecting circuit 32 and the voltage difference determiner 38 of the processor 34 will compare the new voltage numerical indicator Z with the initial voltage numerical indicator X stored in the register 36 of the processor 34 (Block 108). If after $t_1$, the voltage has risen, the processor signals the isolation circuit 40 to continue to permit current to pass between the power source 20 and the electrical system. Again, in the illustrative context of recharging the large battery of a commercial vehicle, a subsequent voltage increase of 1.5V can be expected within 10 seconds. Failure to detect the rise in voltage with the prescribed time interval may indicate an intrinsic problem in the electrical system itself (e.g., the alternator of the vehicle 60 is malfunctioning), and the processor 34 will signal the isolation circuit 40 to electrically isolate the power source 20 from the electrical system (Block 109) to avoid damage to the either the electrical system or the power booster apparatus 10. If the rise in voltage is detected within the prescribed time interval (Block 107), the processor 34 will respond by signaling the isolation circuit to permit current to continue between the power source 20 and the electrical system for a second time interval $t_2$ during which time the polarity will reverse so that the electrical system's now re-charged battery can return charge to the power source 20 of the power booster 10 (Block 110).

Figure 8:
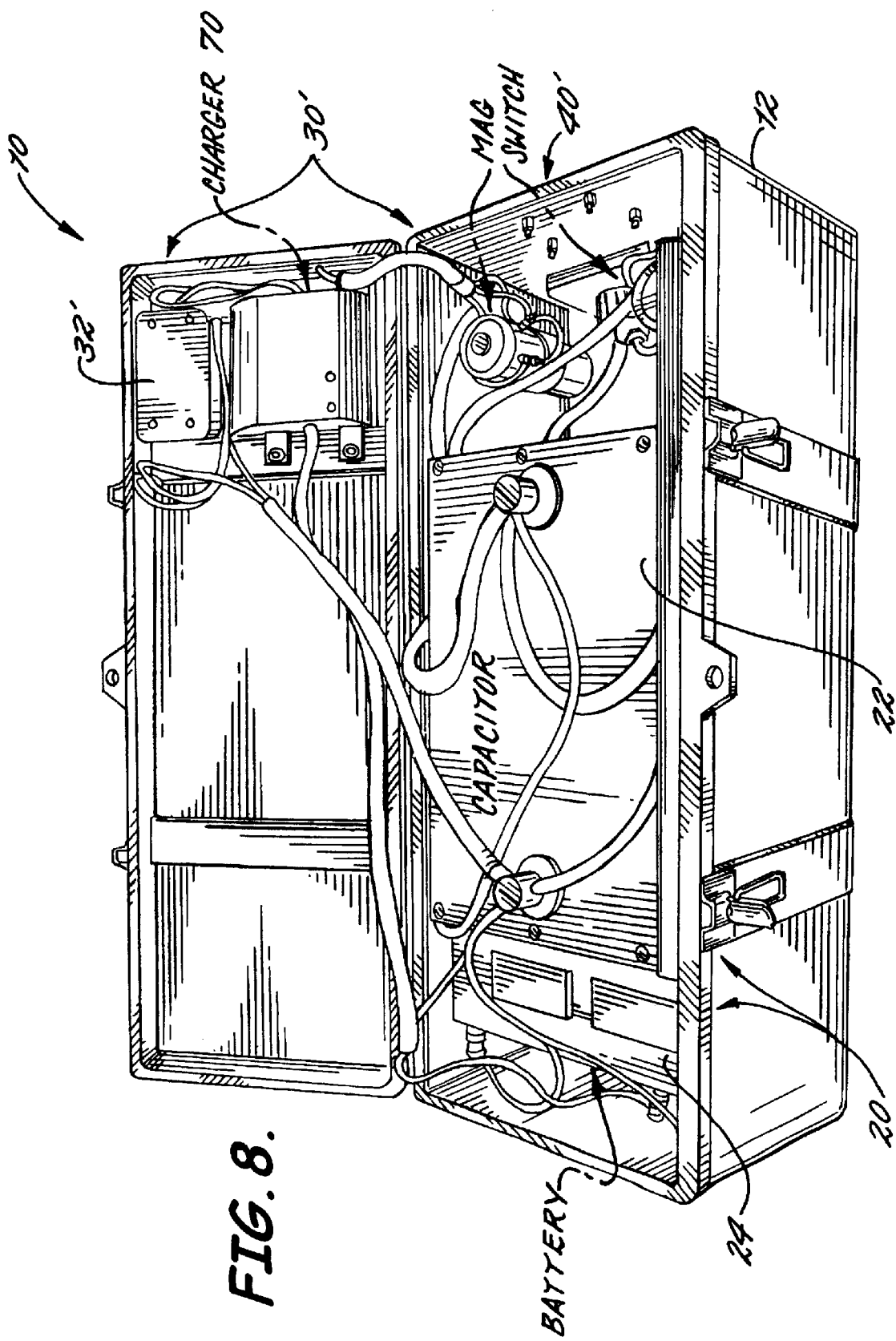
FIG. 8 is a perspective view of an open housing revealing the charger, isolation circuit switch elements, and the capacitor-battery power source of an apparatus for providing supplemental power to an electrical system according to the present invention.
Figure 10:
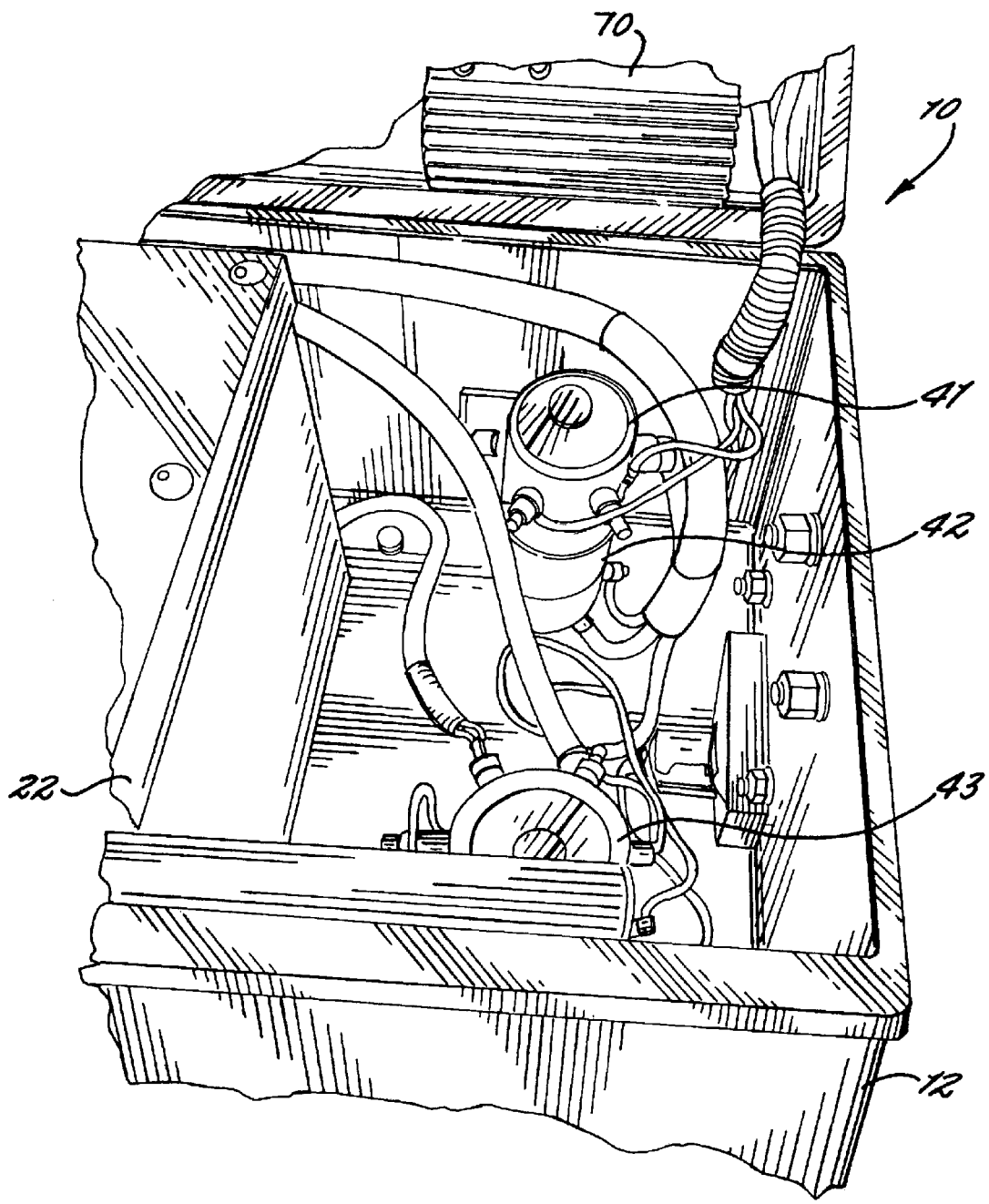
FIG. 10 is a fragmentary perspective view of an open housing revealing an isolation circuit forming part of an apparatus for providing supplemental power to an electrical system according to the present invention.

The isolation circuit 40 can be provided by a set of magnetic switches or alternatively by at least one field effect transistor (FET) as understood by those skilled in the art (see FIGS. 8, 10, and 11). For example, four magnetic switches 41, 42, 43, 44 can be combined as specifically illustrated in FIG. 11. Alternatively, the isolation circuit can comprise a high-current, solid state on/off switch with very low on-resistance such as that provided by the Solid State On/Off Switch, Part No. 13014, manufactured by The IntraUSA Group, Inc. and incorporating Intra's proprietary metallic oxide semi-conductor FET (MOSFET) switches as will also be understood by those skilled in the art.

More generally, the isolation circuit 40 is responsive to the signal of the processor 34, which registers an initial voltage and determines whether a proper power supply connection between the power source 20 and the electrical system has been made. As described herein, when the proper conditions have been verified by the processor 34, an electrical path is provided for controlled, selective current exchange between the power source 20 and the electrical system. When the isolation circuit 40 is closed in response to the processor-based signal, it permits current to pass. Power will then begin to be transferred from the power source 20 to the electrical system. If the series of voltage changes described above occur in sequence, power will continue to be delivered until the current reverses to recharge the power source 20 as also described above.

Figure 5:
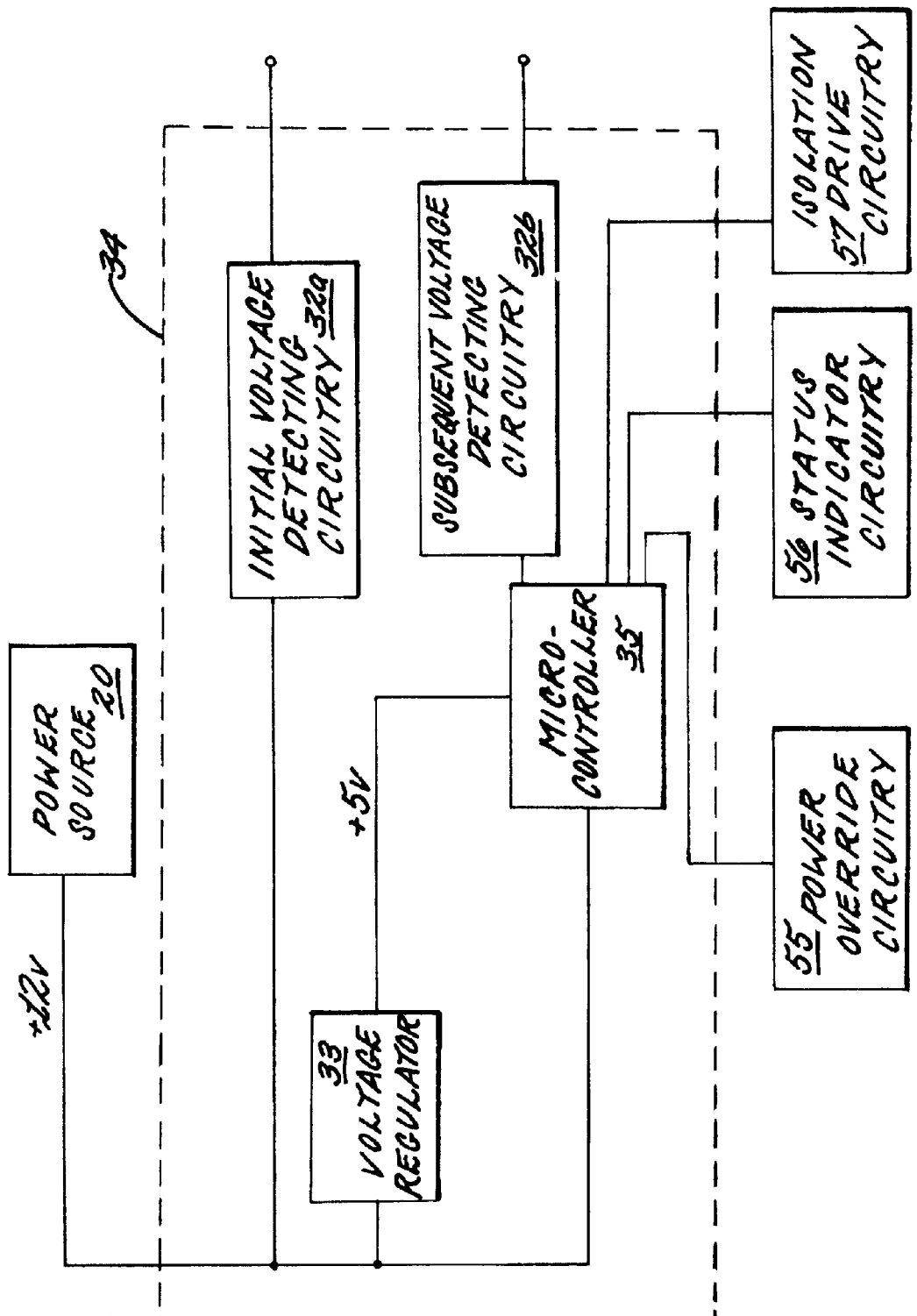
FIG. 5 is a schematic diagram of the circuit elements of a processor used with a power booster to effect control of delivery of power between a power source and electrical system according to the present invention.

FIG. 5 provides a schematic overview of a processor 34 and related circuitry which can be utilized for carrying out the above-described functions of determining an initial voltage, storing the voltage value, and comparing subsequent voltage levels. The processor 34 specifically includes voltage detecting circuitry 32a, 32b for sensing the initial and subsequent voltages. The sensed voltages are conveyed to a microcontroller 35, which can include an analog to digital signal conversion capability that interfaces with the voltage detecting circuitry. The microcontroller 35 stores the initial voltage value in a register 36 and the microcontroller determiner 38 determines when the appropriate conditions for power exchange exist. Accordingly, the microcontroller determines whether the isolation circuit 40 is to be open or closed. More specifically, the microcontroller 35 performs the processing functions of storing the value X that corresponds to the initial voltage sensed and determining numerical decreases X−Y and increases X+Z in electrical system voltage relative to the initially detected voltage X to control power delivery as described above.

The microcontroller 35 can be powered by the power source 20 of the portable power booster 10. A voltage regulator 35 is included as part of the processor 34 to regulate the amount of power delivered to thereby ensure that only as much as needed to drive the microcontroller 35 is delivered.

To effect control over power exchange between the portable power booster 10 and the electrical system, the microcontroller is electrically connected to isolation drive circuitry 57 linking the processor 34 to the isolation circuit 40. As further illustrated in FIG. 5, the microcontroller 35 is also electrically connected to status indicator circuitry 56. The status indicator circuitry 56 can provide numerical or other visual display indicators for indicating the condition of the electrical system at a given moment during the process of providing a power boost. For example, the status indicator can be composed of a set of light emitting diodes (LEDs) that indicate voltage conditions.

The microcontroller 35 is also connected to power override circuitry 55. The power override function allows manual intervention in the event that the electrical system has insufficient residual power to provide even a minimum sensed voltage that would automatically initiate a power boost. For example, with respect to a disabled commercial vehicle, the vehicle's battery may be completely discharged, in which case an initial voltage drop would not be detected so as to signal a proper electrical connection and initiate the power boost. In the event that this occurs, a manual operator can check that, in fact, the connection has been properly made and manually initiate power delivery to the disabled vehicle's electrical system by overriding the microcontroller 35. The override switch can be provided by a standard push-button device 82 that extends outside of the housing 12 of the portable power booster 10 to thereby be operable from a location remote from the electrical system and the portable power booster 10. For example, an operator could manually control delivery of power to a disabled vehicle while sitting in the cab of a service vehicle sent to a remote location to assist the disabled vehicle. The operator would monitor the status indicators and control power delivery accordingly using the push-button switch 82.

Figure 6:
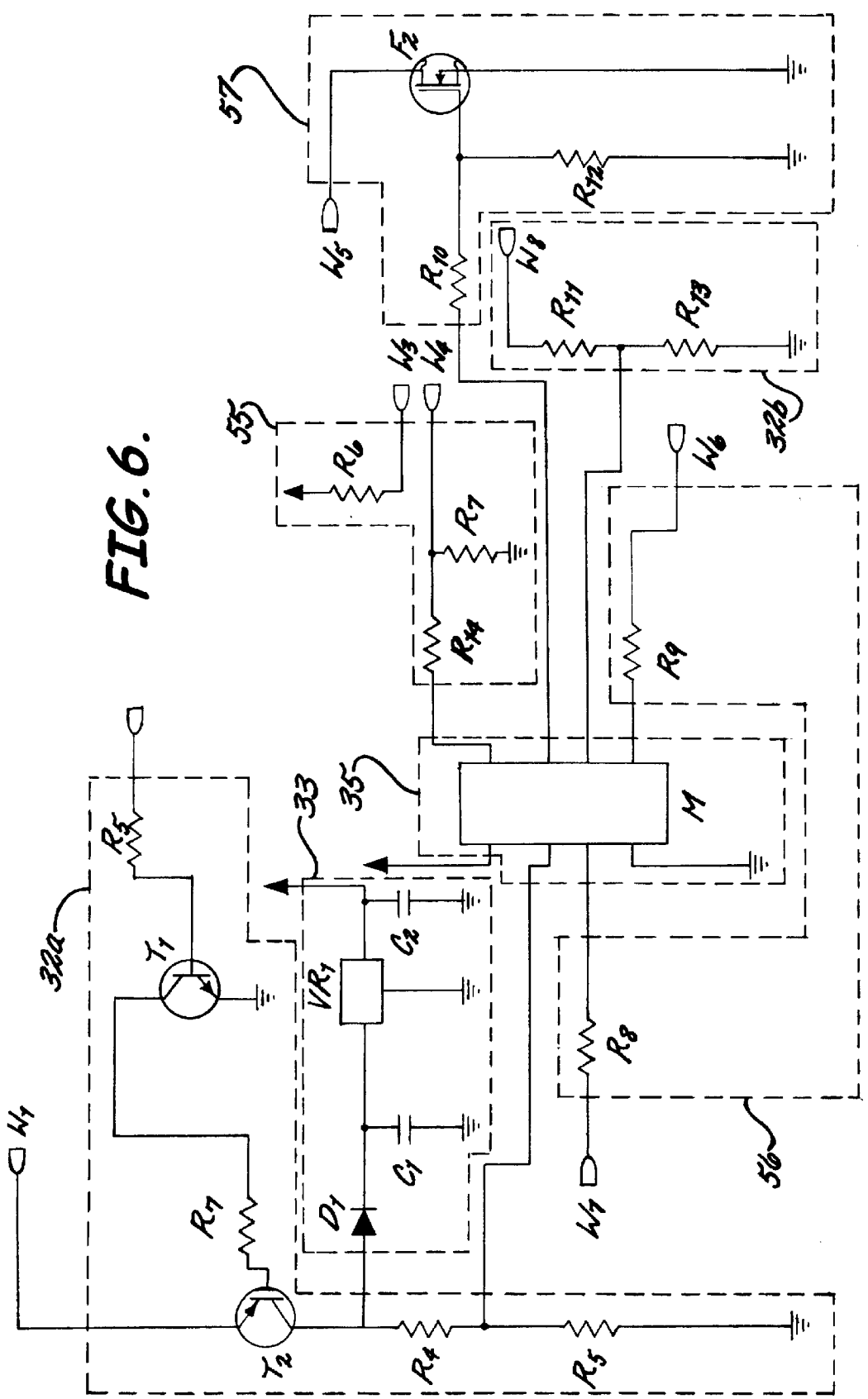
FIG. 6 is a schematic circuit diagram of the elements and connections of detecting circuitry, voltage regulator, and programmable microcontroller for control of delivery of power between a power source and electrical system according to the present invention.

FIG. 6 provides a schematic view of a processor 34 including microcontroller 35 and related circuitry 55, 56, 57 that could be used to provide the power delivery control functions described above. The initial voltage detecting circuitry 32a connects via wire lead W2 to the electrical conductor 14 that connects to the electrical system to receive the power boost. The circuitry is implemented using two transistors T1, T2 and corresponding resistors R5, R7, one transistor T2 connecting to the power source of the portable booster via wire lead W1. Two resistors R4, R5 serve as voltage dividers at the connection of the circuitry to the microcontroller 35. The subsequent voltage detecting circuitry 32b is effected using two resistors R11, R12 again serving as voltage dividers, the circuitry connecting to the electrical conductor 14 at W8 and connected to the microcontroller 35. The voltage regulator, as illustrated, comprises a linear regulator VR1, diode D1, and two capacitors. The override circuitry 55 comprises resistors R6, R7, R14 and connects to manual switch 82 via wire leads W3, W4. Isolation drive circuitry 57 comprises a single field effect transistor (FET) F1 and two resistors R10, R12. The circuitry connects via wire lead W5 to the isolation circuit 40. The status indicator circuitry 56, also connected to the microcontroller 35, comprises two resistors R8, R9 and connects to separate light emitting diodes (LEDs) via wire leads W7, W6.

Figure 12:
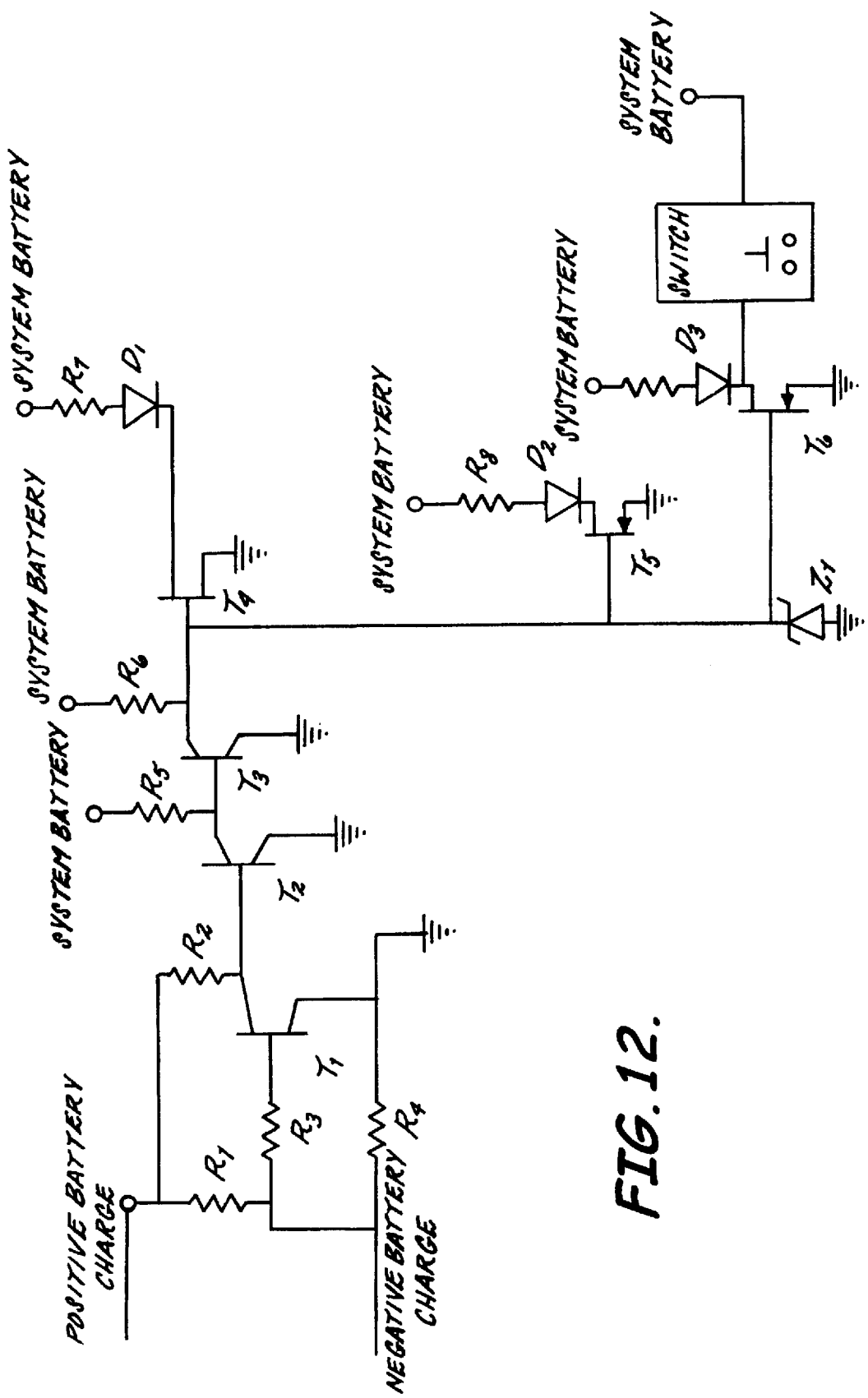
FIG. 12 is a schematic diagram of a logic circuit for detecting voltage levels of an electrical system and forming part of a power delivery controller in an apparatus for providing supplemental power to the electrical system according to the present invention.

As already noted, the isolation circuit 40 can comprise at least one FET or a series of magnetic switches. FIG. 11 specifically illustrates an embodiment, of the power delivery controller 30' that includes an isolation circuit 40' having a plurality of magnetic switches 41, 42, 43, 44 electrically connected to the power source 20 to electrically isolate the power source 20 from the electrical system and prevent any electrical current flow between the power source and the electrical system power except under prescribed conditions for power exchange determined as described below. Preferably, the magnetic switches are arranged in first and second pairs of two series-connected switches 41, 42 and 43, 44 with the first pair 41,42 connected in parallel with the second 43, 44 between the electrical system connected by the outwardly extending conductors 14, 16 and the power source 20 (see FIGS. 6, 8 and 9). In this embodiment, voltage detection is performed by an alternative voltage detecting circuit 32'. Preferably the voltage detecting circuit 32' comprises a network of resistors R1, R2, R3, R4, R5, and transistor T1 connected to transistor and resistors T2,R5, and T3, R6, each connected between the power source and a ground (GND), along with the transistor T4, diode and resistor D1, R7, transistor and diode T5, D2, Zenner diode Z1, and transistor and diode T6, D3 connecting the switch and the electrical conductors as illustrated in FIG. 12 and understood by those skilled in the art. The voltage detecting circuit 32' is electrically connected to the isolation circuit 40' and is responsive to the electrical system to detect voltage levels within the electrical system. This alternative embodiment of the power delivery controller 30' includes an energy delivery signaler 33 electrically connected to the voltage detecting circuit 32' and the isolation circuit 40' to electronically signal the isolation circuit 40' to permit current between the power source 20 and the electrical system when the electrical system voltage is within a predetermined range. The energy delivery signaler preferably includes a manually actuated switch 35 and internal relay circuit 37 responsive to the switch 35.

Figure 13:
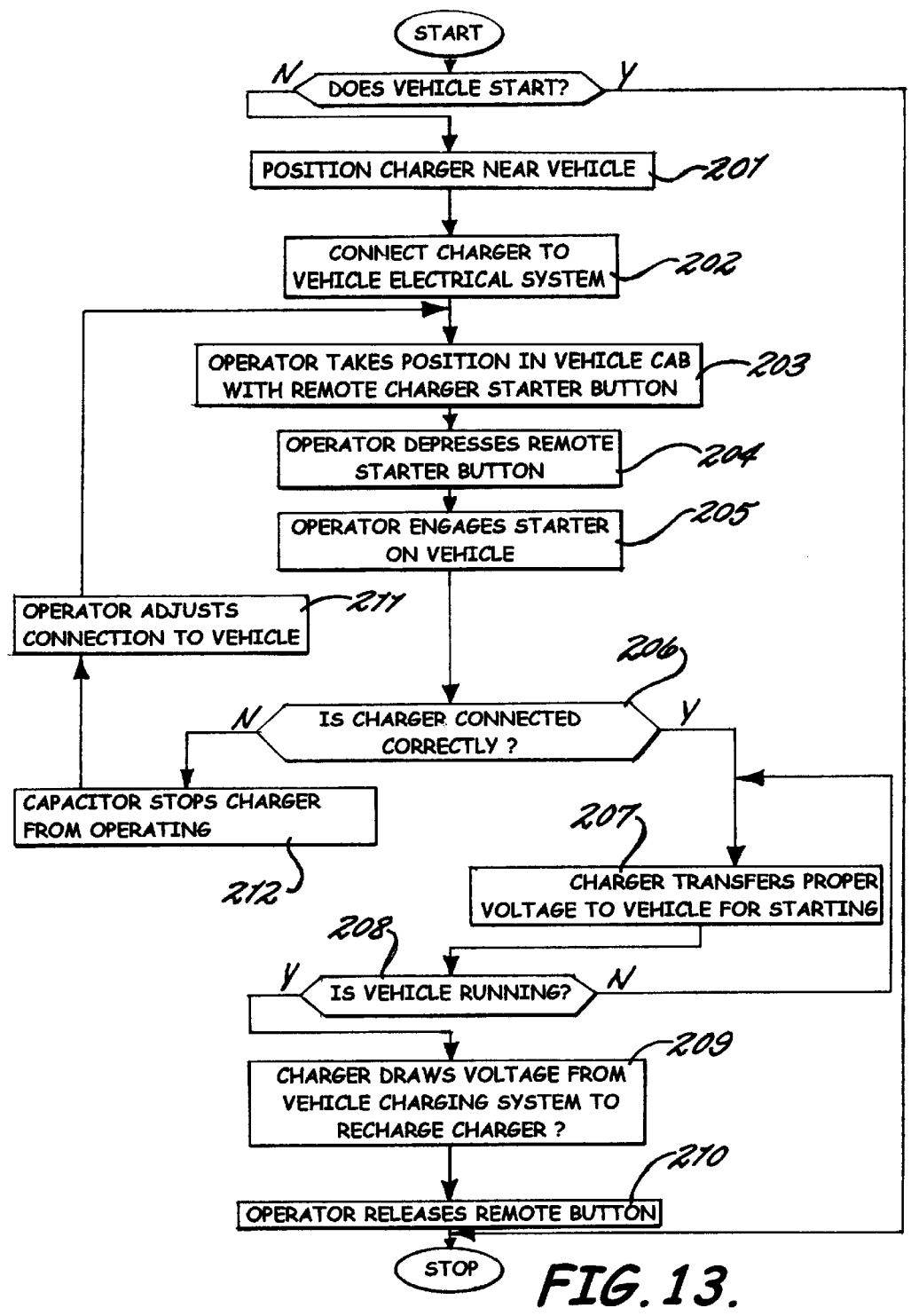
FIG. 13 is a schematic diagram of the method steps and corresponding series of operational functions of an apparatus for providing supplemental power to an electrical system.

FIG. 13 illustrates the operation of this alternative embodiment, as well as an alternative method aspect 200 of the claimed invention. Again, illustrating the application of the claimed invention in the context of providing a power boost to start a disabled-battery-stranded vehicle 60, the portable power booster 10 is positioned near the vehicle 60 (Block 201) and a physical connection between the power source 20 and the vehicle's electrical system is made by removably attaching first and second conductors 14, 16 to the positive and negative terminals 64, 66 of the vehicle's battery 62 (Block 202). An operator is positioned with the switch 35 within the cab of the vehicle to which the portable power booster is connected (Block 203). The operator signals the relay 37 with the switch 35 (Block 204) to thereby electrically engage the electrical system of the vehicle 60 if the power supply connection has been properly made between the power source 20 and the electrical system (Block 205). If the switch 35 has been manually actuated by the operator, voltage in the electrical system is detected in the voltage detecting circuit 32' indicating a proper power supply connection between the power source 20 and the electrical system has been made (Block 206).

If the connection has been properly made so that a minimum voltage level is detected in the electrical system, the magnetic switches 41, 42, 43, 44 respond to the condition. For example, continuing in the context of providing a power boost to a disabled commercial vehicle, the switches respond if at least a 0.7 voltage is detected in the electrical system. If the power supply connection has been properly made so that at least this minimum voltage is detected by the voltage detecting circuit 32' then an electrical circuit is completed, the magnetic switches 41, 42, 43, 44 close and power is delivered to the disabled battery of the electrical system of the vehicle 60 (Block 207). If sufficient power is delivered, the engine of the vehicle will start (Block 208), and if the operator continues to engage the power source 20 using the manually actuated switch 35 so as to maintain an electrical connection between the power source 20 and the electrical system, current will reverse so that the power source 20 receives power from the now-charged battery (Block 209). If a minimum voltage is not detected, however, the isolation circuit 40' prevents any electrical current, and the operator must recheck the connections (Block 110).

Figure 9:
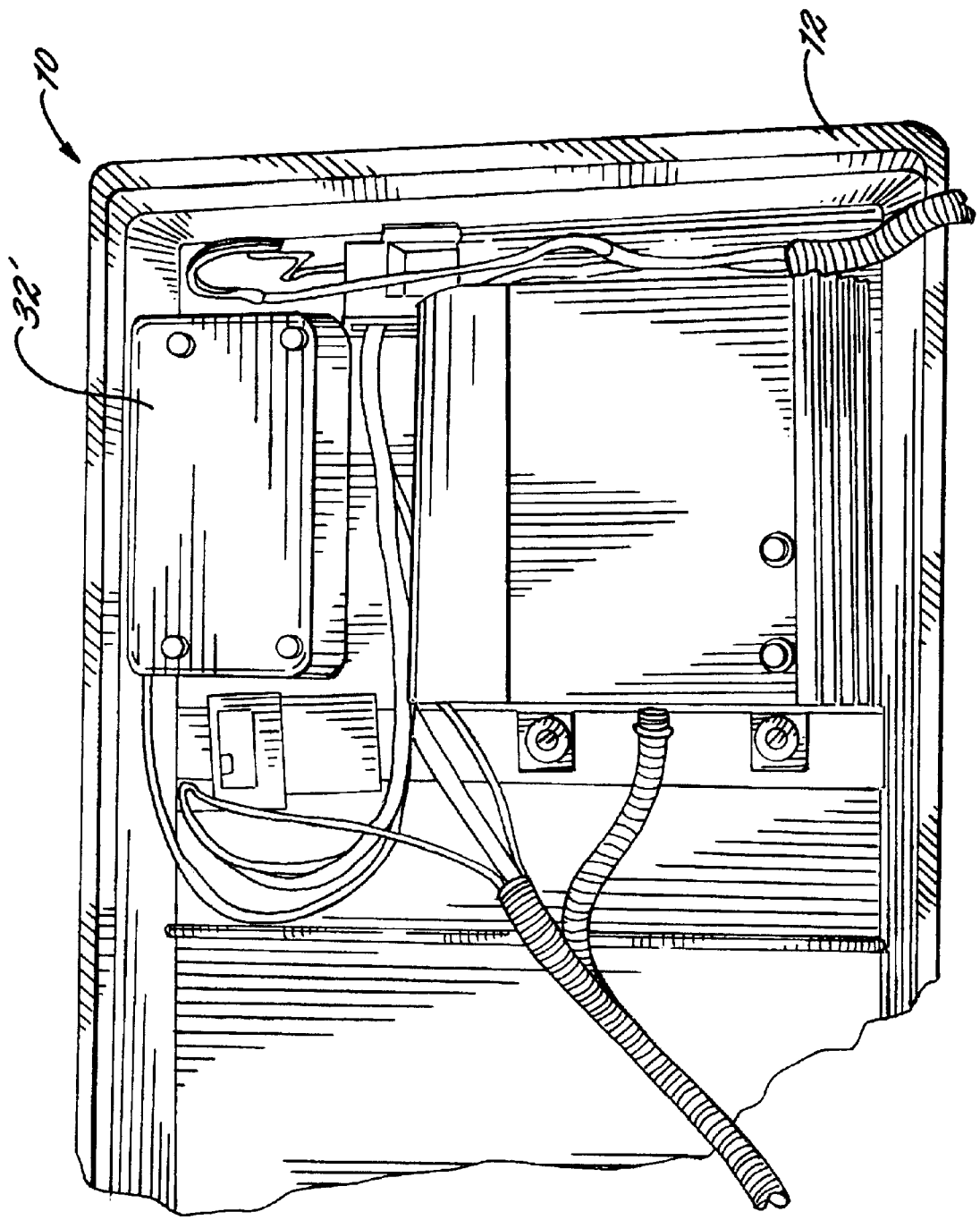
FIG. 9 is a fragmentary perspective view of an open housing revealing the charger and switching circuit of an apparatus for providing supplemental power to an electrical system according to the present invention.

As perhaps best illustrated in FIGS. 6 and 9, the power source 20 of the present invention is preferably provided by a high-density capacitor 22 that rapidly delivers power to the electrical system and a battery 24 electrically connected to the high-density capacitor 22 to maintain the energy level of the capacitor 22 above a preselected minimum and to increase the amount of power delivered by the power source 20 to the electrical system. The first and second electrical conductors 14, 16 extending outwardly from the housing 12, as already described, are electrically connected to the power source 20 and the electrical system to establish a power supply connection between the power source 20 and the electrical system to selectively exchange power between the power source and the electrical system. The capacitor stores a significant amount of charge so as to enable the power source 20 to deliver tremendous energy at a sufficiently high rate, thereby providing significant starting capabilities when the power booster 10 is recharging the disabled battery of a vehicle's electrical system. Specifically, The high-density capacitor 22 and battery 24 of the present invention jointly deliver a minimum of approximately one hundred twenty kilojoules (120 kJ) within ten seconds (10 s) to the electrical system with an efficiency of approximately ninety percent (90%).

Figure 16:
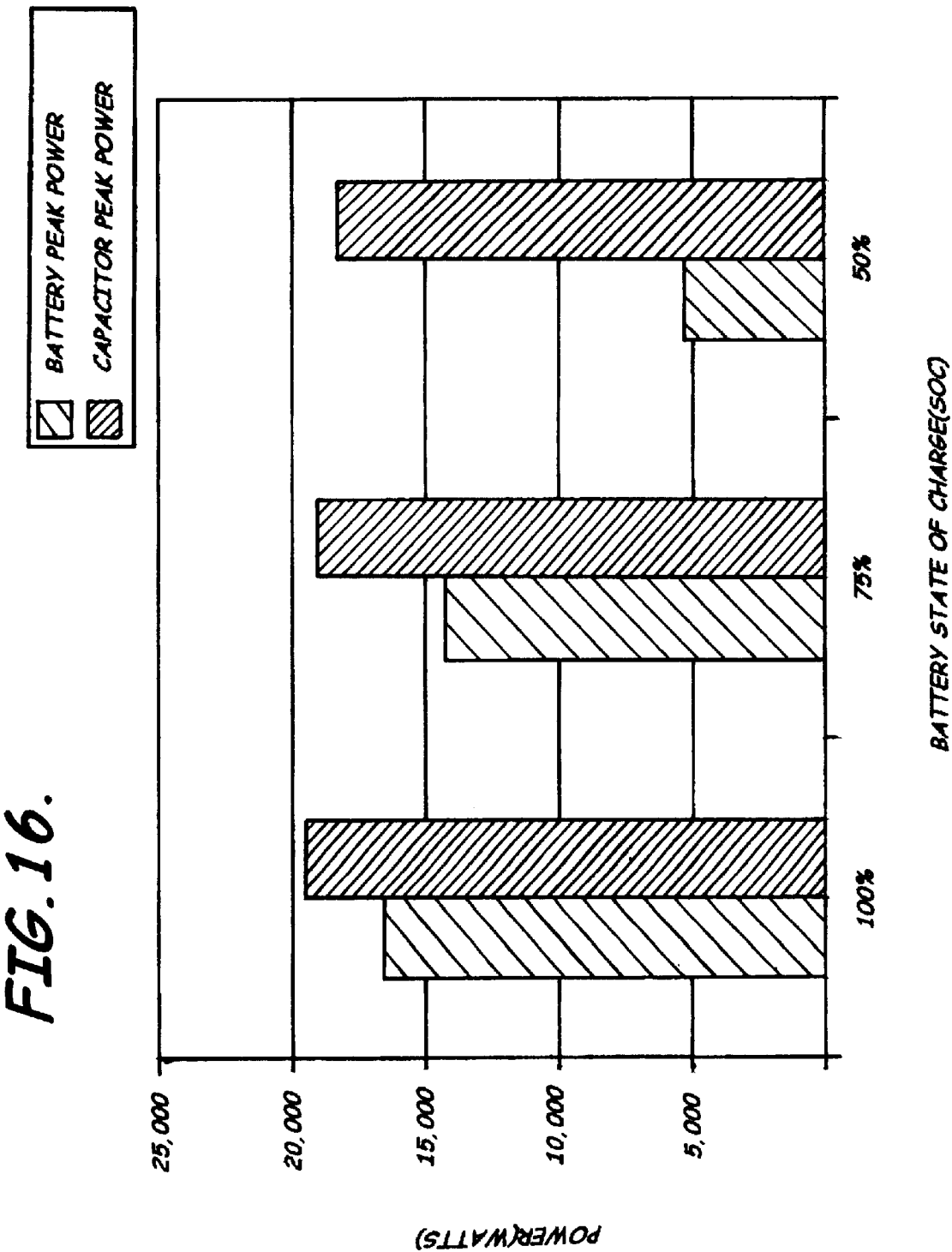
FIG. 16 is a graphical representation of the peak power delivery (watts) to a battery powered electrical system as a function of the state of charge of the electrical system battery (percent), the power being supplied by a conventional battery versus power being supplied by a capacitor according to the present invention.
Figure 17:
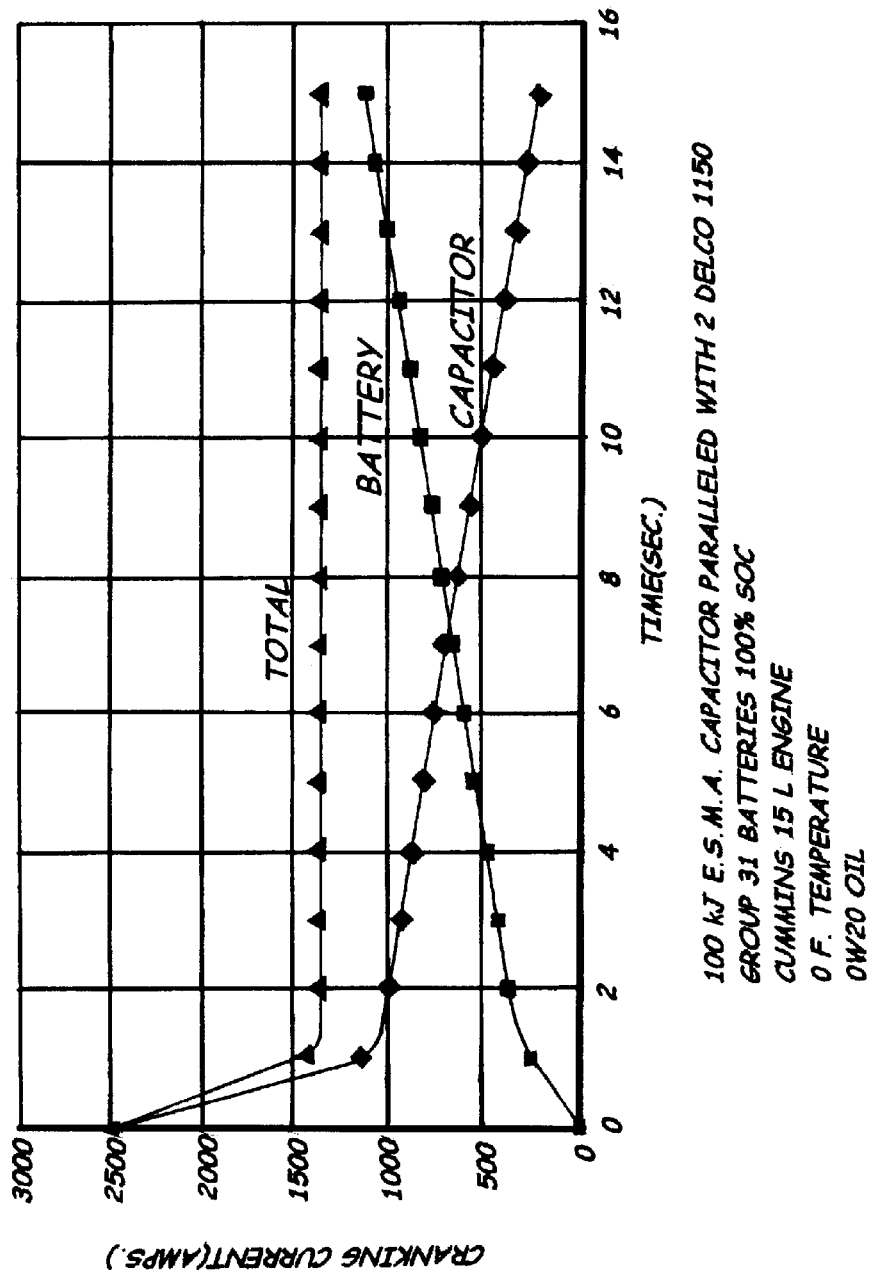
FIG. 17 is a graphical representation of cranking current (amperes) supplied by a battery singly, by a capacitor single, and by a capacitor-battery combination combined capacitor and battery as a function of time (seconds) according to the present invention.

Preferably, the high-density capacitor 22 is an electrochemical capacitor. Through the physical-chemical interactions between the ions in an electrolyte and a solid electrode, such capacitors are able to store energy in the form of a significant amount of charge at the interface between the electrolyte and the solid electrode. Either an electric double layer of excess charge density at the interface or the electrosorption of ions at the interface, or both, contribute to storage of a tremendous amount of charge or stored energy. Thus, the high-density capacitor 22 of the present invention has the capability to transfer a significant amount of power within a short time span. FIG. 16 provides a graphical comparison of capacitor peak power versus conventional battery peak power, both as a function of the state of charge of a battery to be boosted. The power source 20, therefore, provides high-level, rapid-delivery power in an amount sufficient to turn the engine of a vehicle stranded by a disabled battery at speeds sufficient to enable ignition even under most extreme conditions with little or no time delay. As already noted, the power source 20 power is further enhanced by the capacitor-connected battery 24 so as to provide an even greater power boost and to maintain the capacitor 22 at or above a minimum prescribed level. FIG. 17 provides graphical data of the "cranking" current (in amperes) provided by such a combination as a function of time (in seconds). Thus, as graphically illustrated, the capacitor 22 and battery combination 24 of the power source 20 provide a significant advantage over other conventional power sources.

Figure 14:
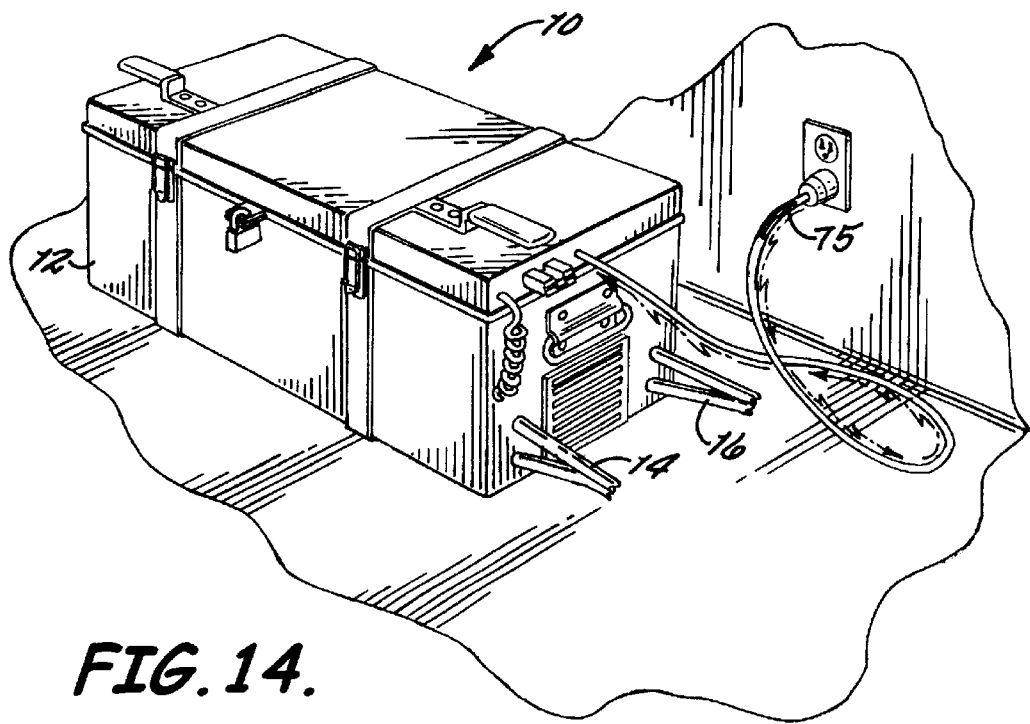
FIG. 14 is a perspective view of an apparatus for providing supplemental power to an electrical system being recharged with a source of power supplied by an alternating current according to the present invention.
Figure 15:
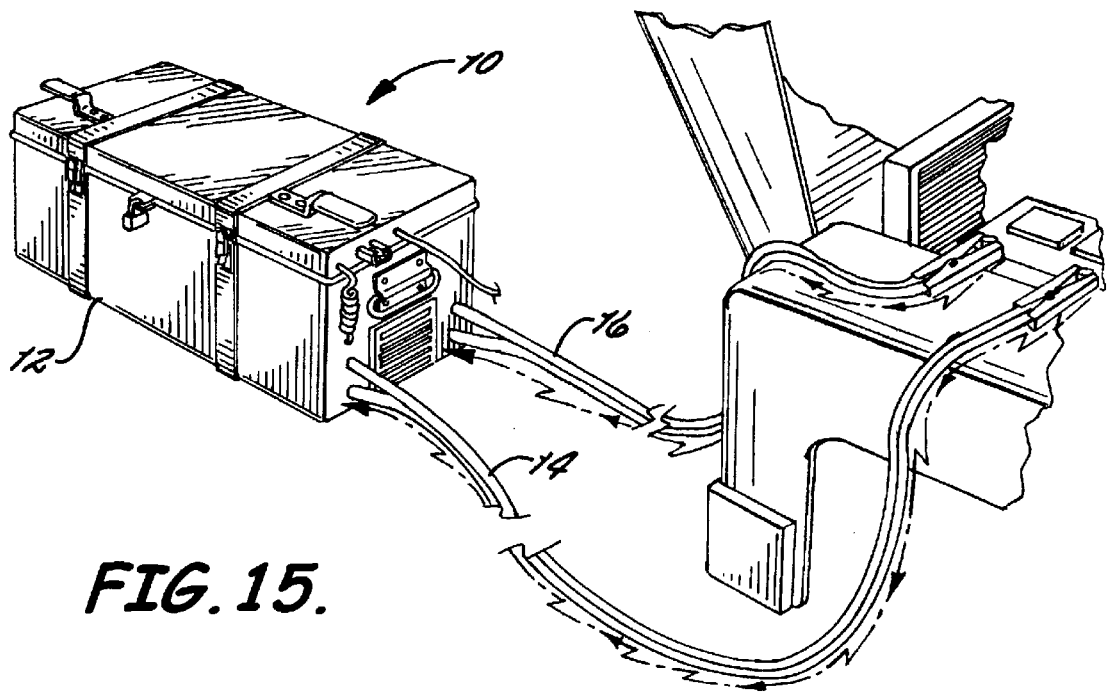
FIG. 15 is a perspective view of an apparatus for providing supplemental power to an electrical system being recharged with a source of power supplied by a direct current provided by a re-charged battery according to the present invention.

As illustrated in FIGS. 4 and 8–11, the power booster 10 preferably also includes a charger 70 electrically connected to the power source 20 and positioned within the housing 12 to receive power from an external energy source to maintain a predetermined energy level within the power source. As further illustrated in FIG. 14, the charger 70 preferably includes first and second alternating current conductors 71, 72 extending outwardly within a cord 75 from the housing 12 through which the power source can obtain energy from an external source of alternating current, as for example when the power booster is electrically connected to an external source of alternating current as provided by a standard AC electrical wall outlet. As illustrated in FIGS. 4 and 11, the charger 70 further includes first and second direct current conductors 73, 74 extending outwardly from the housing 12 through which the power source can obtain energy from an external source of direct current, as for example when the power booster is electrically connected to an external source of direct current as provided by a standard transportation vehicle battery.

Each of the present invention's different embodiments described above are suitable, then, for providing a supplementary power boost to start and recharge the battery (or batteries) of a large, heavy-duty vehicle 60 such as a commercial transport truck that has been disabled by a discharged battery 62. As described in detail above, the rapid-delivery portable power booster 10 of the present invention includes a power source 20 sufficient to turn the alternator of the vehicle and start the engine. Preferably, as also described, the power source is provided by a capacitor-battery combination. The capacitor preferably is an electrochemical capacitor 22, which is supplemented by a battery 24 so as to maintain the high-density charge of the capacitor 22.

The power source 20 delivers in rapid time an intense power boost to a vehicle's electrical system. As also noted above, however, with respect to each embodiment, delivery of power to an electrical system from the high-intensity, rapid-delivery power source 20 is controlled by a power delivery controller 30, 30', as described above, to thereby ensure that too much power is not delivered too quickly. Instead, according to the present invention, the power is delivered directly to the alternator and engine of the disabled vehicle in sufficient quantity to turn the alternator and thereby start the engine. The power delivery controller 30, 30' sequentially detects voltages, makes the necessary comparisons of changing voltage conditions in the vehicle's electrical system, and directs power delivery from the power source 20 accordingly, thereby delivering enough power but no more than necessary to power boost the electrical system while avoiding overloading it with too much rapid-delivery, high-intensity power.

Once the disabled vehicle is started, however, the power delivery controller 30, 30' continues to monitor the voltage conditions so that the engine now begins to transfer power back to the power booster thereby renewing the charge of the capacitor 22 of the power source 20, the charge of which is also maintained with the battery 24 of the power source. Hence, a significant advantage of the present invention is the capability not only to provide a portable source of high-intensity power sufficient to start large, heavy-duty vehicles stranded in remote locations, but to do so repeatedly using the same portable power source which maintains power in virtual perpetuity.

Thus, in a specific illustrative situation, a commercial transport truck disabled by a discharged battery and stranded in a remote location can be started by an operator using the portable power booster 10 described in alternative embodiments above. The operator connects the portable power booster 10 so as to establish a power supply connection. In one embodiment, as described above, the voltage detecting circuit 32 of the power deliver controller 30, comprising at least one FET, senses the voltage of the electrical system of the vehicle to be jump started and stores the corresponding value X in a register 36. An attempt to start the vehicle results in an expected 2.0 volt drop in voltage so that X−2.0 volts is detected by the power delivery controller 30. This voltage drop is an indication of a proper power supply connection having been made so as to complete the circuit and allow the electronic FET to close, upon which event power can be transferred from the power source 20 via the electrical connectors 14, 16 to the vehicle. The connection will be maintained only for time $t_1$ and then broken unless the voltage condition X+1.5 volts is sensed before $t_1$ elapses. Failure to detect the X+1.5 condition within time $t_1$ is an indication the vehicle did not start and/or the alternator is not working properly in which event the power source would be depleted unless the power supply connection is interrupted. If the X+1.5 condition is detected, this indicates that the vehicle's alternator is working properly and the vehicle did start. In this event, the power delivery controller 30 will maintain the connection for a sufficient time $t_2$ to thereby permit power to be supplied from the vehicle to the power source 20 so that the power source is replenished by the alternator of the very vehicle jump started by the portable power booster 10.

An almost identical scenario occurs using the alternative embodiment of the present invention described above. Again, assuming that an operator is using the the portable power booster 10 to start a disabled commercial transport truck stranded in a remote location, the operator is positioned away from the vehicle and portable power booster 10, which the operator controls remotely using the remote switch 35. When the operator throws the switch, current flows from the power source 20 to a coil of the relay 37 causing current to flow from the power source 20 through relay contacts to coils of the magnetic switches and to the voltage detecting circuit 32' of the power delivery controller 30'. At least 0.7 volts should be detected if a proper power supply connection between the power source 20 and the vehicle's electrical system has been made. In this event, the power delivery controller 30' and circuit 32' will allow current to flow to ground at the power source 20, and when the circuit is completed the magnetic switches of the isolation circuit 40' close to allow power to be delivered to the vehicle's electrical system via the electrical connectors 14, 16 as described above. Again, the power supply connection is maintained once the vehicle has been started so as to permit the vehicle alternator to replenish the power source 20 of the portable power booster 10. Otherwise, if the voltage conditions indicate a failure to make a proper connection, then the isolation circuit 40' will prevent any power exchange between the power source 20 and the vehicle's electrical system.

These scenarios involving alternative embodiments illustrate, again, the significant advantages of the present invention described in detail above. The invention provides both a portable power booster 10 having source of high-intensity power 20 able to delivery, in a short time, an amount of power sufficient to start large, heavy-duty vehicles stranded in remote locations, while controlling delivery using a power delivery controller 30 to prevent power overload. Specifically, concentrated power is rapidly delivered directly to a vehicle's alternator and engine in sufficient amounts to start the vehicle engine without having to rely on the vehicle's discharged battery for power. When the vehicle engine starts, the vehicle's engine begins to recharge the discharged vehicle battery, and the electronically controlled isolation circuit blocks further power delivery from the power source. Only power enough to turn the alternator and start the vehicle's engine is delivered from the power source, and no more thereby avoiding risk of providing too much power too quickly. Once the disabled vehicle has been started, the current is reversed so that the power source 20 is replenished by power delivered to the power source 20 from the electrical system of the vehicle. Thus, the portable power booster 10, according to the present invention, has the capability to start a remotely stranded heavy-duty vehicle by rapidly supplying sufficient power directly to the alternator so as to start its engine and to do so repeatedly for numerous stranded vehicles using the same portable power source, the power of which is maintained in virtual perpetuity owing to its capacity to be replenished by the very electrical systems to which it has provided power boosts.

The method aspects of the present invention are also illustrated in FIGS. 1–13. As illustrated, the method for rapidly delivering energy to an electrical system so as to boost the voltage of the electrical system include the steps of electrically connecting a high-voltage capacitor to the electrical system to provide controlled rapid-delivery of energy to the electrical system, sensing the voltage at the connection to determine when the energy can optimally and selectively be supplied to the electrical system, and delivering power to the electrical system from the high-voltage capacitor when the sensed voltage is within a predetermined range.

These and other valuable uses of the present invention will come to mind for those skilled in the relevant art. Indeed, many modifications and other embodiments will come to the mind of one skilled in the art and having the benefit of the teachings present in the foregoing descriptions and the associated drawings. Therefore, it is to be understood that the invention is not to be limited to the specific embodiments disclosed herein, and that the modifications and alternative embodiments are intended to be included within the scope of the appended claims.

That which is claimed is:

1. A rapid-delivery portable power booster for providing a supplementary source of power to an electrical system, the apparatus comprising:

a housing;

a power source positioned within the housing;

first and second electrical conductors electrically connected to the power source and extending outwardly from the housing to establish a power supply connection between the power source and the electrical system to selectively exchange power between the power source and the electrical system, the first conductor being positioned to detachably connect to a positive terminal of the electrical system and the second conductor being positioned to detachably connect to a negative terminal of the electrical system to selectively permit rapid delivery of a concentrated amount of energy from the power source to the electrical system; and a power delivery controller positioned within the housing and connected to the power source to selectively initiate an electrical current within the power supply connection between the power source and the electrical system when the voltage of the electrical system is within a first predetermined range, and maintain the electrical current when the electrical system voltage is within a second predetermined range; and a charger electrically connected to the power source and positioned within the housing to receive power from an external energy source to maintain a predetermined energy level within the power source.

2. A rapid-delivery portable power booster as defined in claim 1 wherein the power delivery controller comprises:

a voltage detecting circuit connected to the first electrical conductor to determine voltages within the electrical system; and a processor responsive to the voltage detecting circuit to provide a numerical indicator corresponding to the detected voltage of the electrical system; and an isolation circuit responsive to the processor to electrically isolate the power source from the electrical system thereby blocking electrical current between them except under predetermined voltage conditions in the electrical system, to permit an electrical current to initiate between the power supply and the electrical system when the processor-determined numerical indicator of the electrical system voltage is within a first predetermined range, and to permit the electrical current to continue when the processor-determined numerical indicator of the electrical system voltage is within a second predetermined range.

3. A rapid-delivery portable power booster as defined in claim 2 wherein the processor comprises a voltage register to store an initial numerical indicator corresponding to an initial detected voltage of the electrical system and a voltage difference determiner responsive to the voltage register to determine numerical increases and decreases in electrical system voltage relative to the initial detected voltage by computing a difference between the initial numerical indicator and subsequent processor-determined numerical indicators corresponding to subsequent voltage levels of the electrical system so that the processor-responsive isolation circuit permits initial current-borne delivery of power from the power source to the electrical system in response to a predetermined decrease in electrical system voltage and continues delivery of power in response to a subsequent predetermined increase in electrical system voltage relative to the initial detected voltage.

4. A rapid-delivery portable power booster as defined in claim 3 wherein the processor further comprises a timer positioned to measure elapsed time between discrete changes in the numerical indicator of electrical system voltages and wherein the processor signals the processor-responsive isolation circuit to interrupt and block current between the power source and the electrical system when said predetermined increase in voltage fails to occur within a first preselected elapsed time interval.

5. A rapid-delivery portable power booster as defined in claim 4 wherein the timer is positioned to measure elapsed time during which current is passed between the power source and wherein the processor signals the isolation circuit to permit a current to be maintained between the power source and the electrical system within a second preselected elapsed time interval when the preselected increase in voltage occurs within the first preselected elapsed time interval so as to thereby permit a subsequent change in current direction such that during the second preselected elapsed time interval the electrical system will at least partially recharge the power source.

6. A rapid-delivery portable power booster as defined in claim 1 wherein the charger includes first and second alternating current conductors extending outwardly from the housing through which the power source can obtain energy from an external source of alternating current (AC) when the power booster is electrically connected to an external source of alternating current as provided by a standard AC electrical outlet, and wherein the charger further includes first and second direct current (DC) conductors extending outwardly from the housing through which the power source can obtain energy from an external source of direct current when the power booster is electrically connected to an external source of direct current as provided by a standard transportation vehicle battery.

7. A rapid-delivery portable power booster for providing a supplementary source of power to an electrical system, the apparatus comprising:

a housing; and a power source positioned within the housing and comprising a high-density capacitor to rapidly deliver power to the electrical system and a battery electrically connected to the capacitor to maintain the energy level of the capacitor above a preselected minimum and to increase the amount of power delivered to the electrical system;

first and second electrical conductors electrically connected to the power source and extending outwardly from the housing to establish a power supply connection between the power source and the electrical system to selectively exchange power between the power source and the electrical system, the first conductor being positioned to detachably connect to a positive terminal of the electrical system and the second conductor being positioned to detachably connect to a negative terminal of the electrical system to selectively permit rapid delivery of a concentrated amount of energy from the power source to the electrical system; and a power delivery controller positioned within the housing and connected to the power source comprising:

an isolation circuit electrically connected to the power source to electrically isolate the power source from the electrical system and prevent any current between the power source and the electrical system when power is not being exchanged between the power source and the electrical system, a voltage sensing circuit electrically connected to the isolation circuit, the voltage sensing circuit being responsive to the electrical system to sense voltage levels within the electrical system, and an energy delivery signaler electrically connected to the voltage measuring circuit and the isolation circuit to electronically signal the isolation circuit to permit current between the power source capacitor and battery and the electrical system when the electrical system voltage is within a predetermined range; and a charger electrically connected to the power source and positioned within the housing to receive power from an external energy source to maintain at least a predetermined energy level within the power source.

8. A rapid-delivery portable power booster as defined in claim 7 wherein the energy delivery signaler comprises an electrical relay positioned within the housing which is responsive to an external switch positioned outside the housing and in electrical communication with the isolation circuit to provide remote control over the exchange of power between the power source and the electrical system.

9. A rapid-delivery portable power booster as defined in claim 7 wherein the high-density capacitor and battery jointly deliver a minimum of approximately one hundred twenty kilojoules (120 kJ) within ten seconds (10 s) to the electrical system with an efficiency of approximately ninety percent (90%).

10. A rapid-delivery portable power booster as defined in claim 9 wherein the isolation circuit comprises at least a pair of magnetic switches electrically connected to the first conductor.

11. A rapid delivery portable power booster apparatus for providing a supplementary source of power to an electrical system, the apparatus comprising:

a housing; and rapid power delivery means positioned within the housing for delivering a high-voltage burst of power to the electrical system;

voltage detecting means positioned within the housing and responsive to the voltage of the electrical system for detecting the voltage of the electrical system;

energy isolation means positioned within the housing and in communication with the voltage detecting means for preventing an exchange of power between the power booster and the electrical system unless the voltage of the electrical system is within a predetermined range; and connecting means in electrical communication with the rapid energy delivery means and extending outside the housing for connecting the apparatus to the electrical system for rapid-burst energy delivery to the electrical system.

12. A rapid delivery portable power booster as described in claim 11 further comprising electrical charging means positioned within the housing and in communication with the rapid energy delivery means to receive energy from an external energy source and transfer the external energy to the rapid energy delivery means to maintain the capacity of the rapid energy delivery means to deliver a predetermined minimum level of energy to the electrical system.

13. A rapid delivery portable power booster as described in claim 11 wherein the rapid energy delivery means has a capacity to deliver a minimum of approximately one hundred twenty kilojoules (120 kJ) within ten seconds (10 s) to the electrical system with an efficiency of approximately ninety percent (90%).

14. A rapid delivery portable power booster as described in claim 11 wherein the electrical charging means comprises alternative direct current (DC) and alternating current (AC) receiving means to selectively and alternatively receive power from an external source of alternating current (AC) and an external source of direct current (DC).

15. A rapid delivery portable power booster as described in claim 11 further comprising switching means positioned outside the housing and in electrical communication with the energy isolation means and the rapid energy delivery means for providing remote control over the delivery of energy to the electrical system by means of activating and deactivating the rapid energy delivery means.

16. A rapid delivery portable power booster as described in claim 15 wherein the switching means is provided by a manually actuated switch connected to the energy isolation means and the rapid energy delivery means by an elongate electrical conductor.

17. A rapid-delivery portable power booster for providing a supplementary source of power to an electrical system, the apparatus comprising:

a power source comprising a high-density capacitor to rapidly deliver power to the electrical system and a battery electrically connected to the capacitor to maintain the energy level of the capacitor above a preselected minimum and to increase the amount of power delivered to the electrical system;

first and second electrical conductors electrically connected to the power source to establish a power supply connection between the power source and the electrical system to selectively exchange power between the power source and the electrical system, the first conductor being positioned to detachably connect to a positive terminal of the electrical system and the second conductor being positioned to detachably connect to a negative terminal of the electrical system to selectively permit rapid deliver of a concentrated amount of energy from the power source to the electrical system; and a power delivery controller connected to the power source to selectively initiate an electrical current within the power supply connection between the power source and the electrical system when the voltage of the electrical system is within a first predetermined range, and maintain the electrical current when the electrical system voltage is within a second predetermined range.

18. A rapid delivery portable power booster as described in claim 17 wherein the power source has a capacity to deliver a minimum of approximately one hundred twenty kilojoules (120 kJ) within ten seconds (10 s) to the electrical system with an efficiency of approximately ninety percent (90%).

19. A rapid delivery portable power booster as described in claim 18 wherein the portable power booster further comprises a power source recharger to recharge the power source by selectively and alternatively receiving power from an external source of alternating current (AC) and an external source of direct current (DC).

20. A method for rapidly delivering power to an electrical system so as to boost the voltage of the electrical system, the method comprising the steps of:

electrically connecting a high-voltage capacitor to the electrical system to provide controlled rapid-delivery of power to the electrical system;

sensing the voltage at the connection to determine when the power can optimally and selectively be supplied to the electrical system; and delivering power to the electrical system from the high-voltage capacitor when the sensed voltage is within a predetermined range.

21. A method as defined in claim 20 further comprising the step of reversing power exchange to thereby deliver power from the voltage-boosted electrical system to the high-voltage capacitor to thereby maintain the energy level of the capacitor at or near a preselected minimum level.

22. A method as described in claim 20 wherein the step of delivering power to the electrical system from the high-voltage capacitor comprises delivering a minimum of approximately one hundred twenty kilojoules (120 kJ) within ten seconds (10 s) to the electrical system with an efficiency of approximately ninety percent (90%).

23. A method for recharging a starter battery of a vehicle powered by an internal combustion engine and having an electrical system with alternator associated with the starter battery and engine for starting the vehicle engine, the method comprising the steps of:

positioning an independently transportable portable power source having a high-density capacitor adjacent the vehicle; and establishing a power supply connection between the electrical system of the vehicle and the portable power source for rapid delivery of power to the connected electrical system; and delivering power to the electrical system of the vehicle in a quantity sufficient to turn the alternator and thereby start the internal combustion engine independently from the starter battery and preventing any additional power delivery when the engine is started.

24. A method as defined in claim 23 wherein the steps of positioning a portable power source having a high-density capacitor for rapid delivery of power to the connected electrical system adjacent the vehicle and establishing a power supply connection between the electrical system of the vehicle and the portable power source comprises positioning a portable power source comprising an electrochemical capacitor and establishing a power supply connection between the electrical system of the vehicle and the electrochemical capacitor of the portable power source.

25. A method for recharging a starter battery of a vehicle powered by an internal combustion engine and having an electrical system with alternator associated with the starter battery and engine for starting the vehicle engine, the method comprising the steps of:

establishing a power supply connection between the electrical system of the vehicle and a portable power source having a high-density capacitor for rapid delivery of power to the connected electrical system;

sensing the voltage of the electrical system and delivering power to the electrical system from the high-voltage capacitor when the sensed voltage is within a predetermined range; and delivering power to the electrical system of the vehicle in a quantity sufficient to turn the alternator and thereby start the internal combustion engine independently from the starter battery and preventing any additional power delivery when the engine is started.

26. A method as described in claim 25 further comprising the step of maintaining the power supply connection after the engine is started to thereby replenish the energy stored by the high-density capacitor simultaneously as the now-running engine recharges the vehicle battery.

* * * * *